(12) United States Patent
Ye et al.

(10) Patent No.: US 12,127,222 B2
(45) Date of Patent: Oct. 22, 2024

(54) NETWORK-ASSISTED SIDELINK RESOURCE SELECTION

(71) Applicant: APPLE INC., Cupertino, CA (US)

(72) Inventors: Chunxuan Ye, Cupertino, CA (US); Yushu Zhang, Beijing (CN); Dawei Zhang, Cupertino, CA (US); Haitong Sun, Cupertino, CA (US); Hong He, Cupertino, CA (US); Huaning Niu, Cupertino, CA (US); Seyed Ali Akbar Fakoorian, Cupertino, CA (US); Wei Zeng, Cupertino, CA (US); Weidong Yang, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 332 days.

(21) Appl. No.: 17/440,168

(22) PCT Filed: Jan. 12, 2021

(86) PCT No.: PCT/CN2021/071290
§ 371 (c)(1),
(2) Date: Sep. 16, 2021

(87) PCT Pub. No.: WO2022/150972
PCT Pub. Date: Jul. 21, 2022

(65) Prior Publication Data
US 2023/0096275 A1  Mar. 30, 2023

(51) Int. Cl.
*H04W 72/02* (2009.01)
*H04W 72/40* (2023.01)
*H04W 72/566* (2023.01)

(52) U.S. Cl.
CPC .......... *H04W 72/40* (2023.01); *H04W 72/02* (2013.01); *H04W 72/566* (2023.01)

(58) Field of Classification Search
CPC .... H04W 72/02; H04W 72/40; H04W 72/566
See application file for complete search history.

(56) References Cited

U.S. PATENT DOCUMENTS

| 11,051,304 B2* | 6/2021 | Lee ................. H04W 72/0453 |
| 11,109,334 B2* | 8/2021 | Khoryaev ............ H04L 5/0091 |
| 11,115,981 B2* | 9/2021 | Lee ..................... H04W 72/542 |
| 11,452,115 B2* | 9/2022 | Khoryaev ............ H04W 72/02 |

(Continued)

FOREIGN PATENT DOCUMENTS

| CN | 110495231 | 11/2019 |
| CN | 111565373 | 8/2020 |

OTHER PUBLICATIONS

Discussion on Resource Allocation for Pedestrian UE, Apple, 3GPP TSG-RAN WG2 Meeting #112e, R2-2009528, 2020, 4 pages.

(Continued)

*Primary Examiner* — Alpus Hsu
(74) *Attorney, Agent, or Firm* — Kilpatrick Townsend & Stockton LLP

(57) ABSTRACT

The present application relates to devices and components including apparatuses, systems, and methods for network-assisted sidelink resource selection in order to facilitate sidelink communications. Some embodiments include a base station providing information to configure a pool of sidelink resources and to provide an indication of a type of assistance information available for selecting resources of the pool. Other embodiments are also disclosed.

19 Claims, 14 Drawing Sheets

(56) References Cited

U.S. PATENT DOCUMENTS

| | | | |
|---|---|---|---|
| 11,457,429 B2* | 9/2022 | Lee | H04W 72/53 |
| 11,553,503 B2* | 1/2023 | Parron | H04W 4/46 |
| 2020/0107171 A1 | 4/2020 | Chen et al. | |
| 2020/0229195 A1* | 7/2020 | Lien | H04L 5/001 |
| 2021/0084660 A1* | 3/2021 | Taherzadeh Boroujeni | H04L 5/0057 |
| 2021/0099994 A1* | 4/2021 | Park | H04L 1/1861 |
| 2021/0204100 A1* | 7/2021 | Lin | H04L 1/0003 |
| 2021/0204217 A1* | 7/2021 | Balasubramanian | H04W 72/04 |
| 2021/0212053 A1* | 7/2021 | Ji | H04W 28/24 |
| 2022/0015088 A1* | 1/2022 | Pateromichelakis | H04L 41/0853 |
| 2022/0030575 A1* | 1/2022 | Farag | H04W 72/20 |

OTHER PUBLICATIONS

Resource Allocation to Reduce Power Consumption, ZTE Corporation, Sanechips, 3GPP TSG-RAN WG2 Meeting #112-e, R2-2009027, 2020, 4 pages.

International Patent Application No. PCT/CN2021/071290, International Search Report and Written Opinion, Mailed on Oct. 14, 2021, 10 pages.

3rd Generation Partnership Project; Technical Specification Group Radio Access Network; NR; Multiplexing and channel coding (Release 16), 3GPP TS 38.212 V16.4.0, Dec. 2020, 152 pages.

3rd Generation Partnership Project; Technical Specification Group Radio Access Network; NR; Physical layer procedures for control (Release 16), 3GPP TS 38.213 V16.4.0, Dec. 2020, 181 pages.

3rd Generation Partnership Project; Technical Specification Group Radio Access Network; NR; Physical layer procedures for data (Release 16), 3GPP TS 38.214 V16.4.0, Dec. 2020, 169 pages.

3rd Generation Partnership Project; Technical Specification Group Radio Access Network; NR; Radio Resource Control (RRC) protocol specification (Release 16), 3GPP TS 38.331 V16.3.1, Jan. 2021, 932 pages.

3rd Generation Partnership Project; Technical Specification Group Radio Access Network; NR; Physical Layer Procedures for Data (Release 16), 3GPP Standard, 3GPP TS 38.214 RAN WG1, V16.4.0, Jan. 8, 2021, pp. 1-169.

Resource Allocation Mechanisms for Power Saving, Ericsson, 3GPP TSG-RAN WG1 Meeting #102-e, R1-2006444, Aug. 17-Aug. 28, 2020, 5 pages.

Sidelink Resource Allocation for Power Saving, 3GPP TSG RAN WG1 #103-e, R1-2008917, Lenovo, Motorola Mobility, Oct. 26-Nov. 13, 2020, 7 pages.

International Patent Application No. PCT/CN2021/071290, International Preliminary Report on Patentability, Jul. 27, 2023, 6 pages.

International Patent Application No. PCT/US2021/064318, International Preliminary Report on Patentability, Jul. 27, 2023, 9 pages.

International Patent Application No. PCT/US2021/064318, International Search Report and Written Opinion, Apr. 21, 2022, 12 pages.

* cited by examiner

NETWORK-ASSISTED SIDELINK RESOURCE SELECTION

CROSS-REFERENCE TO RELATED APPLICATION

This application is a 371 U.S. National Phase of PCT International Patent Application No. PCT/CN2021/071290, filed Jan. 12, 2021, which is herein incorporated by reference in its entirety for all purposes.

BACKGROUND

Third Generation Partnership Project (3GPP) provides mechanisms for two or more user equipments (UEs) to communicate with one another over sidelink interfaces. Further study on enhancing resource allocation to facilitate sidelink communications is needed.

DETAILED DESCRIPTION

Figure 1:
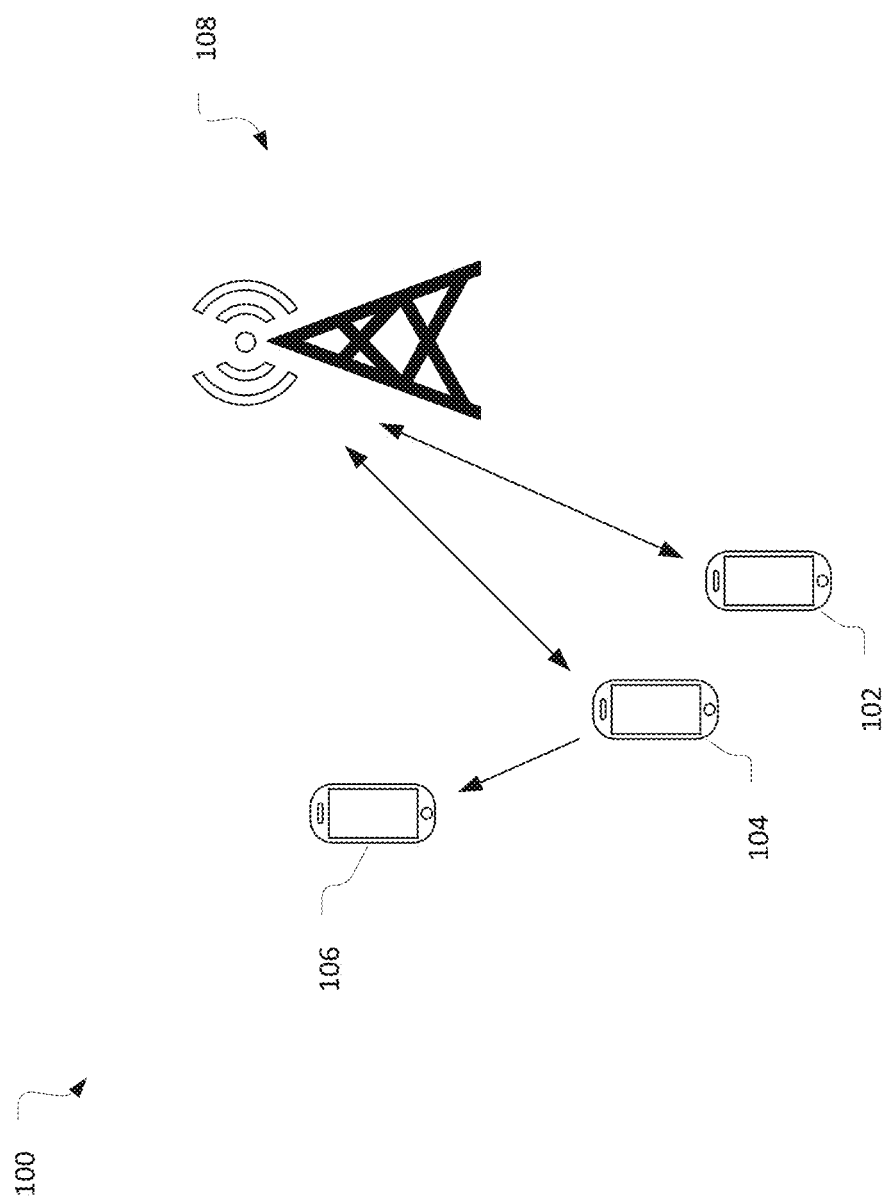
FIG. 1 illustrates a network environment in accordance with some aspects.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various aspects. However, it will be apparent to those skilled in the art having the benefit of the present disclosure that the various aspects of the various aspects may be practiced in other examples that depart from these specific details. In certain instances, descriptions of well-known devices, circuits, and methods are omitted so as not to obscure the description of the various aspects with unnecessary detail. For the purposes of the present document, the phrase "A or B" means (A), (B), or (A and B).

The following is a glossary of terms that may be used in this disclosure.

The term "circuitry" as used herein refers to, is part of, or includes hardware components such as an electronic circuit, a logic circuit, a processor (shared, dedicated, or group) or memory (shared, dedicated, or group), an application specific integrated circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable system-on-a-chip (SoC)), digital signal processors (DSPs), etc., that are configured to provide the described functionality. In some aspects, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these aspects, the combination of hardware elements and program code may be referred to as a particular type of circuitry.

The term "processor circuitry" as used herein refers to, is part of, or includes circuitry capable of sequentially and automatically carrying out a sequence of arithmetic or logical operations, or recording, storing, or transferring digital data. The term "processor circuitry" may refer an application processor, baseband processor, a central processing unit (CPU), a graphics processing unit, a single-core processor, a dual-core processor, a triple-core processor, a quad-core processor, or any other device capable of executing or otherwise operating computer-executable instructions, such as program code, software modules, or functional processes.

The term "interface circuitry" as used herein refers to, is part of, or includes circuitry that enables the exchange of information between two or more components or devices. The term "interface circuitry" may refer to one or more hardware interfaces, for example, buses, I/O interfaces, peripheral component interfaces, network interface cards, or the like.

The term "user equipment" or "UE" as used herein refers to a device with radio communication capabilities and may describe a remote user of network resources in a communications network. The term "user equipment" or "UE" may be considered synonymous to, and may be referred to as, client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface.

The term "computer system" as used herein refers to any type interconnected electronic devices, computer devices, or components thereof. Additionally, the term "computer system" or "system" may refer to various components of a computer that are communicatively coupled with one another. Furthermore, the term "computer system" or "system" may refer to multiple computer devices or multiple computing systems that are communicatively coupled with one another and configured to share computing or networking resources.

The term "resource" as used herein refers to a physical or virtual device, a physical or virtual component within a computing environment, or a physical or virtual component within a particular device, such as computer devices, mechanical devices, memory space, processor/CPU time, processor/CPU usage, processor and accelerator loads, hardware time or usage, electrical power, input/output operations, ports or network sockets, channel/link allocation, throughput, memory usage, storage, network, database and applications, workload units, or the like. A "hardware resource" may refer to compute, storage, or network resources provided by physical hardware element(s). A "virtualized resource" may refer to compute, storage, or network resources provided by virtualization infrastructure to an application, device, system, etc. The term "network resource" or "communication resource" may refer to resources that are accessible by computer devices/systems via a communications network. The term "system resources" may refer to any kind of shared entities to provide services, and may include computing or network resources. System resources may be considered as a set of coherent functions, network data objects or services, accessible through a server where such system resources reside on a single host or multiple hosts and are clearly identifiable.

The term "channel" as used herein refers to any transmission medium, either tangible or intangible, which is used to communicate data or a data stream. The term "channel" may be synonymous with or equivalent to "communications channel," "data communications channel," "transmission channel," "data transmission channel," "access channel," "data access channel," "link," "data link," "carrier," "radio-frequency carrier," or any other like term denoting a pathway or medium through which data is communicated. Additionally, the term "link" as used herein refers to a connection between two devices for the purpose of transmitting and receiving information.

The terms "instantiate," "instantiation," and the like as used herein refers to the creation of an instance. An "instance" also refers to a concrete occurrence of an object, which may occur, for example, during execution of program code.

The term "connected" may mean that two or more elements, at a common communication protocol layer, have an established signaling relationship with one another over a communication channel, link, interface, or reference point.

The term "network element" as used herein refers to physical or virtualized equipment or infrastructure used to provide wired or wireless communication network services. The term "network element" may be considered synonymous to or referred to as a networked computer, networking hardware, network equipment, network node, virtualized network function, or the like.

The term "information element" refers to a structural element containing one or more fields. The term "field" refers to individual contents of an information element, or a data element that contains content. An information element may include one or more additional information elements.

FIG. 1 illustrates a network environment 100 in accordance with some aspects. The network environment 100 may include UEs 102, 104, and 106, and a base station 108. The base station 108 may provide a wireless access cell through which one or more of the UEs 102/104/106 may communicate with the base station 108. In some aspects, the base station 108 is a gNB that provides 3GPP New Radio (NR) cell. The air interfaces over which the UEs 102/104/106 and base station 108 communicate may be compatible with 3GPP technical specifications (TSs) such as those that define Fifth Generation (5G) NR system standards.

Two or more of the UEs 102/104/106 may also communicate directly with one another over a sidelink interface. The sidelink interface may alternatively be referred to as a ProSe interface, device-to-device (D2D) interface, or a PC5 interface or reference point. In some aspects, the network environment 100 may be deployed within a vehicular communication system. In a vehicular communication system, the UEs 102/104/106 may communicate with one another using cellular vehicle-to-everything (V2X) communications. V2X may involve vehicle-to-vehicle (V2V), vehicle-to-infrastructure (V2I), vehicle-to-network (VTN), or vehicle-to-pedestrian (V2P) communications.

While FIG. 1 depicts the UEs 102/104/106 as mobile phones, the UEs 102/104/106 may be any type of user equipment such as those described below with respect to UE 1300 of FIG. 13.

The UEs 102/104/106 may communicate with one another using a sidelink resource pool. The sidelink resource pool may include a set of time/frequency resources for sidelink transmission or reception. The sidelink resource pool may be used for all unicast, groupcast, or broadcast communications for a given UE engaging in sidelink communications. In the frequency domain, the resource pool may include a plurality of subchannels, with each sub channel including a plurality of physical resource blocks (PRBs). In various aspects, a subchannel may include 10, 12, 15, 20, 25, 50, 75, or 100 PRBs, for example. In some aspects, the PRBs of a subchannel, and the subchannels of a resource pool may be contiguous.

In the time domain, a sidelink resource pool may include a plurality of slots, which may be contiguous or noncontiguous. In some aspects, the slots for a sidelink resource pool may be configured by, for example, a bitmap transmitted by the base station 108 to indicate which slots are part of a sidelink resource pool. The bitmap may have a periodicity of 10,240 ms and a bitmap length between 10-160. In some aspects, a physical slot may include all slots including non-sidelink slots, while a logical slot may only include slots in the resource pool. For example, consider a 10-bit bitmap as follows: [1, 1, 0, 1, 1, 0, 1, 1, 1, 1]. This bitmap indicates that 10 physical slots include 8 logical slots of a sidelink resource pool.

In other aspects, the sidelink resource pool may include time or frequency domains of other sizes.

Resources of the sidelink may be allocated in a number of ways. For example, in a first mode (mode 1), the base station 108 may provide a sidelink grant to a UE. In a second mode (mode 2), a UE may sense a sidelink channel and select its own resources from the sidelink resource pool for transmission.

Mode 2 resource allocation may include a plurality of operations including, for example: resource pool configuration; sensing; resource selection; and sidelink transmission.

Resource pool configuration may include the base station 108 providing a UE with the configuration information via control signaling, for example, radio resource control (RRC) signaling. Additionally/alternatively the configuration of the resource pool may include accessing predefined configuration information stored at a UE.

After a UE is configured with a resource pool, a transmitting UE may perform a sensing procedure. Within a sensing window, the transmitting UE will decode sidelink control information (SCI) to determine a data priority indication and resource reservation information. The transmitting UE may also measure energy of the resources to determine a channel quality metric such as, for example, reference signal received power (RSRP). The sidelink RSRP measurement may be based on physical sidelink control channel (PSCCH) demodulation reference signal (DMRS) or physical sidelink shared channel (PSSCH) DMRS.

Based on the sensing operation, the UE will select resources from within a resource selection window. The resources may be selected with a subchannel granularity in the frequency domain and a slot granularity in the time domain. The UE may identify candidate resources within the resource selection window. A resource of the resource selection window may be excluded from the candidate resources if it is reserved or its associated RSRP measurement is above a predetermined threshold. The UE may then select resources from the identified candidate resources. In some aspects, the selection may be randomized.

The UE may then encode the sidelink data on the selected resources for transmission.

UEs such as pedestrian UEs may have reduced power capabilities as compared to vehicle-based UEs. Thus, various alternatives to the above sensing modes may be used to reduce power consumption. Some of these alternatives includes a no-sensing mode, in which random resources are selected for transmission without sensing the channel, and a partial-sensing mode, in which a UE is configured with specific monitoring periods.

The no-sensing mode enables sidelink communication for low-cost or reduced-complexity UEs. For example, a UE configured only for sidelink transmission, and not sidelink reception, which may be referred to herein as a transmit-only UE, may be an important part of pedestrian UEs in V2X scenarios. For example, a transmit-only UE may be able to proactively announce its presence, or convey other alerts, to notify other road users. Without requiring receive operations in the sidelink, there is no need for sidelink discontinuous reception (DRX) and significant power savings may be achieved.

In some aspects, a transmit-only UE may be considered to use type-A sidelink communication, which may be used as a reference for evaluation and design of sidelink power saving features in NR V2X Release 17. In type-A sidelink communication, the UE may not be capable of performing any reception of any sidelink signals or channels, with the possible exception of performing physical sidelink feedback channel or sidelink synchronization signal block (S-SSB) reception.

For purposes of the present description, the UE 104 may be considered to be a transmit-only UE. For example, the UE 104 may transmit on a sidelink channel to the UE 106 but may not receive communications directly from the UE 106 over the sidelink channel. The UE 104 may be connected to the cell provided by base station 108 and may be capable of transmitting communications to the base station 108 and receiving communications from the base station 108.

In some aspects, the UE 104 may be a transmit-only UE because it lacks the resources to receive sidelink communications, for example, the UE 104 may not include a sidelink receiver. In other aspects, the UE 104 may be capable of receiving sidelink communications, but may be configured in a transmit-only operating mode in which, for example, the sidelink receiver is deactivated. For example, the UE 104 may be periodically or dynamically configured to operate using type-A sidelink communications.

A transmit-only UE does not perform any sensing operation and may randomly select resources from a resource pool. Randomly selected resources may have a large collision probability. Thus, various aspects describe how to reduce a collision probability for a transmit-only UE that is unable to monitor the sidelink channel. Some aspects describe utilizing the base station 108 to assist by providing various operations to support resource reevaluation or pre-emption (RRP). In particular, aspects describe the base station 108 providing sensing results to the UE 104 to allow the UE to perform resource reevaluation or preemption based on the sensing results. The sensing results may come from the base station 108 itself or from a coordinating UE, such as UE 102. Other aspects describe the base station 108 performing the RRP operations for the UE 104 and providing the results of the RRP operations to the UE 104. The base station 108 may perform the RRP operations based on sensing results from the coordinating UE 102, for example.

RRP operations may be based on sensing of the sidelink channel before transmitting. An RRP operation may include resource reevaluation or resource preemption. In some aspects, the resource preemption may follow the resource reevaluation.

Figure 2:
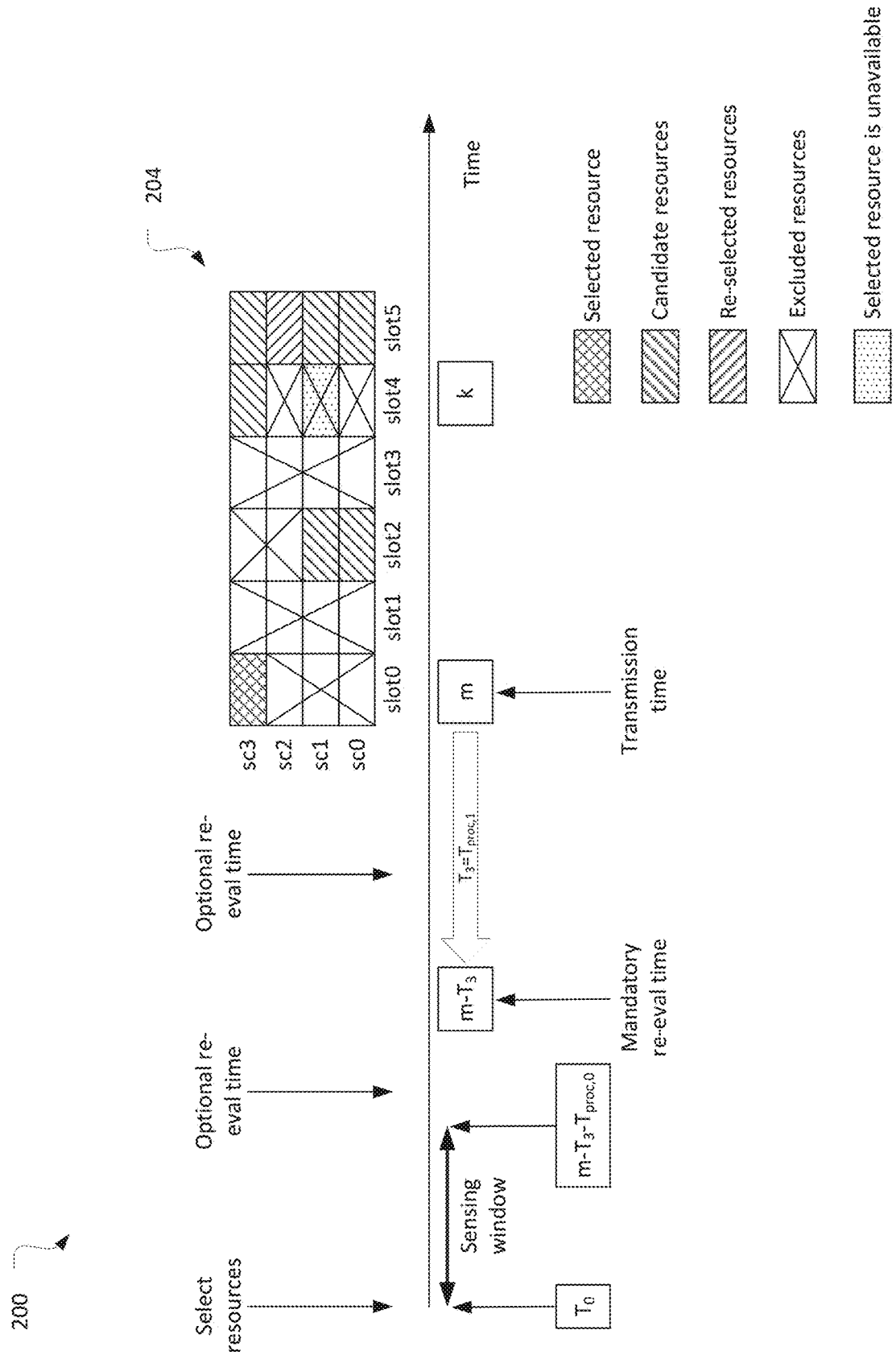
FIG. 2 illustrates a resource reevaluation in accordance with some aspects.

FIG. 2 illustrates a resource reevaluation 200 in accordance with some aspects. The resource reevaluation 200 may be conducted before transmission of a sidelink control information (SCI) with reservation. Thus, the resource reevaluation 200 may be related to the selection of resources before they are reserved.

The resource reevaluation 200 may be done with respect to a resource pool 204. The resource pool 204 is shown as having four subchannels (sc1-sc4) in the frequency domain and six slots (slot0-slot5) in the time domain. In other aspects, the resource pool 204 may be divided into other numbers of subchannels and slots or divided differently in the time-frequency domain.

Before $T_0$, the device may sense energy in various resources of the resource pool 204 and determine whether they are candidate resources or excluded resources based on comparing the sensed energy to a predetermined threshold. The device may then randomly select one or more initial resources from the candidate resources. As shown, the initially selected resources may include a first resource (sc3, slot0) and a second resource (sc1, slot4). For timing purposes, slot 0 may correspond to slot m, while slot 4 may correspond to slot k. At $T_0$, the second resource (sc1, slot4) may be considered an available, candidate resource.

After selection of initial resources at $T_0$, a device may continue to sense the energy of the resources of the resource pool 204 throughout a sensing window. The sensing window may be at least to m-$T_3$-$T_{proc,0}$, where $T_3$=$T_{proc,1}$, $T_{proc,0}$ is a processing time of sensing results, and $T_{proc,1}$ is a processing time of preparing sidelink transmissions.

The device may identify the candidate resource set at least by performing a resource reevaluation at m-$T_3$. Sensing information after the sensing window may not need to be included in the resource reevaluation at m-$T_3$.

If the initially selected resources are not in the candidate resource set identified at the resource reevaluation, the device may randomly select updated resources from the identified candidate resource set. Thus, through the resource reevaluation, the device may determine whether the initially selected resources have been subsequently reserved by another UE or have otherwise become unavailable. If the device determines through the resource reevaluation that one or more of the initially selected resources have become unavailable, it may reselect a corresponding one or more resources. For example, as shown, the device may determine that the selected resource (sc1, slot4) has become unavailable and may reselect a resource in the following slot, for example, resource (sc2, slot5).

The device may also perform one or more optional reevaluations before or after the mandatory reevaluation at m-$T_3$. Whether the device performs these optional reevaluations may depend on device implementation or configuration.

In some aspects, if, after m-$T_3$, a device detects that an initially selected resource is not in the candidate resource set a resource reselection may not be required.

At a transmission time, corresponding to slot m, a UE may transmit in the first selected resource, for example, resource (sc3, slot0). The transmission may include SCI that also reserves the re-selected resource, for example, resource (sc2, slot5).

Figure 3:
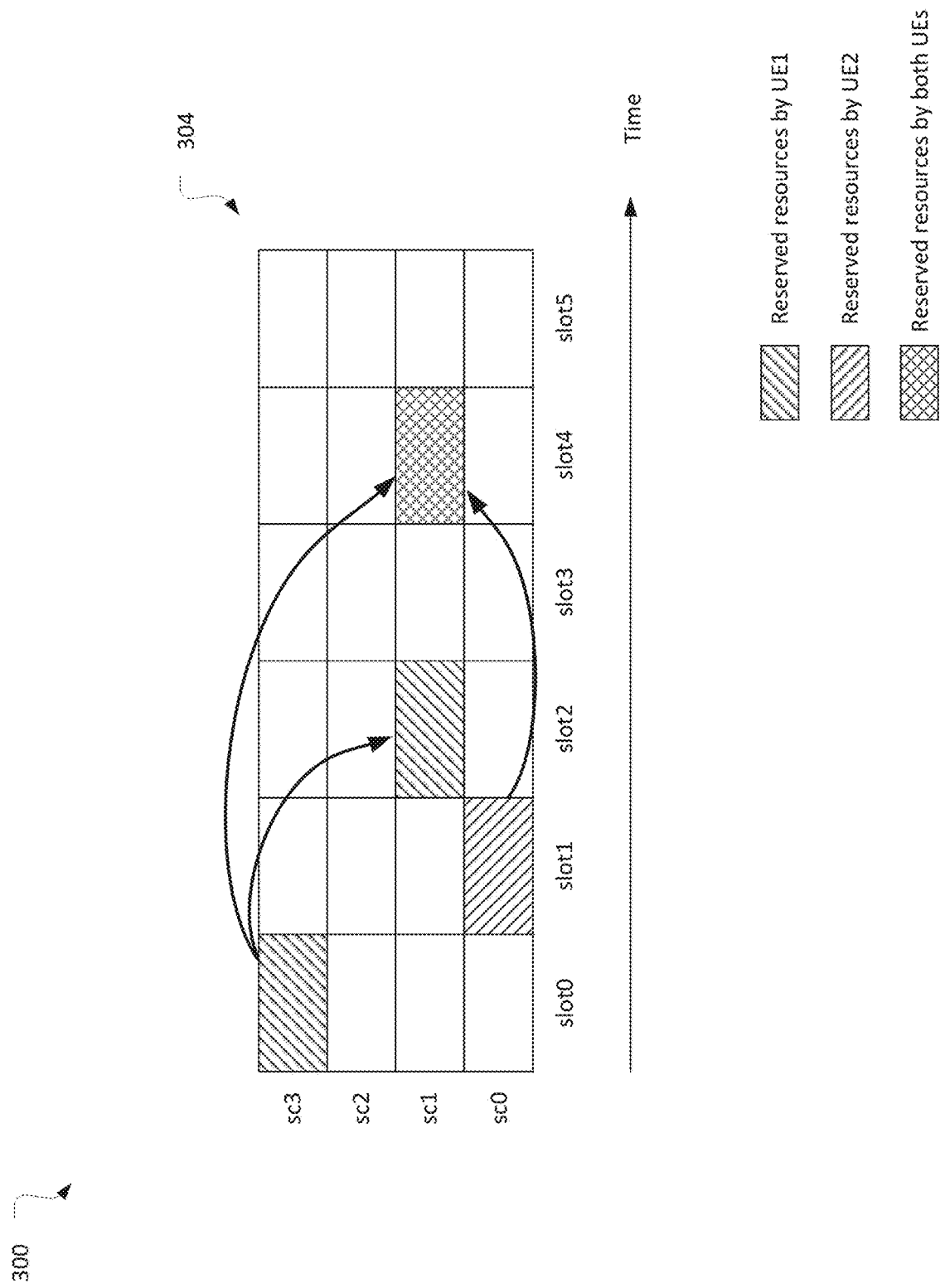
FIG. 3 illustrates a resource preemption in accordance with some aspects.

FIG. 3 illustrates a resource preemption 300 in accordance with some aspects. The resource preemption 300 may be performed with respect to two UEs (for example, UE 1 and UE 2) performing sidelink communications.

The resource preemption 300 may be used to handle reserved resources. Resources selected for a UE by, for example, performing the resource reselection 200, may be preempted if the UE's reserved resources are overlapped with resources of a higher priority reservation from a different UE.

Consider, for example, that UE 1 selects three resources from resource pool 304 for transmission, resource (sc3, slot0), resource (sc1, slot2), and resource (sc1, slot4). When the UE1 transmits a sidelink communication using resource (sc3, slot0) it may include SCI that also reserves resource (sc1, slot2) and resource (sc1, slot4). Further consider that UE 2 has selected resource (sc0, slot1) and resource (sc1, slot4). When UE 2 transmits a sidelink communication using resource (sc0, slot1) it may include SCI that also reserves resource (sc1, slot4). Thus, resource (sc1, slot4) is reserved by both UE 1 and UE 2.

The SCI that reserves a subsequent resource may also include a data priority indication to indicate a priority associated with data to be transmitted in the subsequent resource. This SCI may be broadcast or otherwise decodable by other UEs. In this manner, UE 1 and UE 2 may determine which data has a higher priority and, therefore, which transmission is preempted. For example, if the data to be transmitted by UE 2 has a relatively higher priority, the UE 1 may not use the resource (sc1, slot4) for transmission. Alternatively, if the data to be transmitted by UE 1 has a relatively higher priority, the UE 2 may not use the resource (sc1, slot4) for transmission.

If a first UE detects a resource reservation from a second UE, via an SCI transmitted from the second UE, the first UE may not always exclude that reserved resource. The first UE may determine whether the reservation signal from the second UE is strong (for example, a measured RSRP is above a threshold). If the measured RSRP is above the threshold, the first UE may exclude the resource. However, if the measured RSRP is not above the threshold, the second UE may be a sufficient distance from the first UE to allow the resource to be reused (for example, used by both the first and second UEs).

The UE having the relatively lower priority data may reselect resources in order to replace the overlapped resources. Both full and partial frequency domain overlap in the same slot may be considered as overlapping. Thus, the whole resource may be re-selected, even if it is only partially overlapped with a higher-priority transmission.

In some aspects, the re-selection procedure may not happen if preemption occurs at a moment later than m-T3 for a preempted resource at slot m. In this case, the UE with the preempted data may restart the initial resource selection/resource reevaluation/preemption in a subsequent resource pool.

FIGS. 4-8 present a number of operation flows/algorithmic structures in accordance with aspects of this disclosure. These operation flow/algorithmic structures describe a number of operations in a particular sequence. However, the presented sequences are not restrictive. That is, the operations may be performed in sequences other than those specifically presented.

Figure 4:
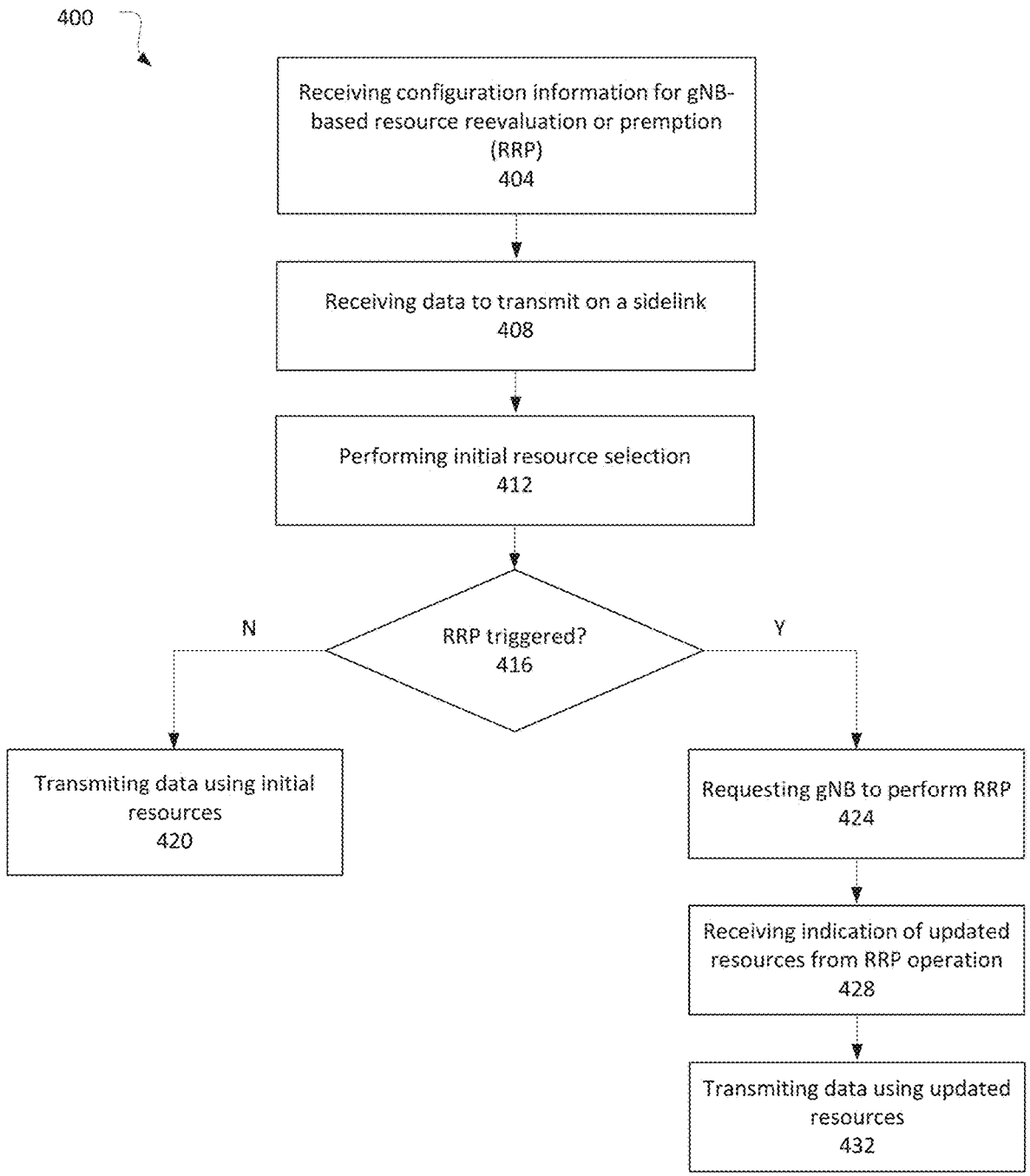
FIG. 4 illustrates an operational flow/algorithmic structure in accordance with some aspects.

FIG. 4 illustrates an operation flow/algorithmic structure 400 in accordance with some aspects. The operation flow/algorithmic structure 400 may be performed or implemented by a transmit-only UE such as, for example, UE 104 or 1300; or components thereof, for example, baseband processor 1304A.

The operation flow/algorithmic structure 400 may include, at 404, receiving configuration information for a gNB-based RRP operation. In some aspects, the configuration information may include a configuration of the resource pool that is to be used for sidelink communications. In some aspects, the resource pool configuration may have an indication that a gNB-assisted RRP feature is enabled for the resource pool so that the transmit-UE may request assistance from the gNB in performing the RRP operation.

The configuration information may be received by RRC signaling. In some instances, the configuration received at 404 may be in response to a UE capability report previously transmitted to the gNB. For example, the UE may transmit a capability report that indicates the UE is a transmit-only UE. At a later time, the gNB may transmit the configuration information that configures the UE with the gNB-assisted RRP.

In some aspects, the configuration information received at 404 may include the indication that gNB-assisted RRP is enabled along with a configuration of the time-frequency resources of the resource pool. In other aspects, the configuration information may include the indication and may reference a predefined or previously configured resource pool. The predefined resource pool may be statically defined by, for example, a 3GPP TS.

The operation flow/algorithmic structure 400 may further include, at 408, receiving data to transmit on a sidelink. The data may be received at one component of the UE (for example, baseband processing circuitry) from another component of the UE (for example, a central processing unit (CPU) processing circuitry). In some aspects, the data may be associated with a priority that is based on the content of the data.

The operation flow/algorithmic structure 400 may further include, at 412, performing an initial resource selection. The initial resource selection may be a random selection of resources from the configured resource pool. In some aspects, the number of resources initially selected may be greater than a number of resources needed to transmit the data.

The operation flow/algorithmic structure 400 may further include, at 416, determining whether an RRP operation is triggered. In some aspects, the RRP operation may be triggered based on the data that is to be transmitted. A number of examples are provided below for triggering the RRP operation. These examples are not exclusive of one another. For example, one or more of the examples may be combined and collectively serve as a basis for triggering the RRP operation.

In a first example, the RRP operation may be triggered based on a priority of the sidelink data to be transmitted. In particular, the RRP operation may be triggered for relatively high priority sidelink data, and may not be triggered for relatively low priority sidelink data. Determining whether the priority of the sidelink data is sufficient to trigger the RRP operation may be based on comparing the priority to a predefined data priority threshold. The data priority threshold may be configured by the gNB or statically defined in a 3GPP TS.

In a second example, the RRP operation may be triggered based on a periodicity of the sidelink data to be transmitted. For example, periodic sidelink data may trigger the RRP operation while aperiodic sidelink data may not.

In a third example, the RRP operation may be triggered based on a packet delay budget (PDB) of the sidelink data to be transmitted. If the sidelink data has a relatively large PDB, it may be acceptable to take any extra time that may be necessary to complete the RRP operation. So, in accordance with some aspects, if the PDB of the sidelink data is larger than a predetermined threshold, the RRP may be triggered. Otherwise, the RRP may not be triggered. The predetermined threshold may be configured by the gNB or statically defined by a 3GPP TS.

In a fourth example, the RRP may be triggered based on a time interval between the random selection of the initial resources and a first-occurring resource of the initial resources. If the selected resource is more than a predetermined threshold from a time in which the resource was selected, the RRP operation may be triggered. Otherwise, the RRP operation may not be triggered. The predetermined threshold may be configured by the gNB or statically defined by a 3GPP TS.

If, at 416, it is determined that the RRP operation is not triggered, the operation flow/algorithmic structure 400 may advance to transmitting data using the initial resources. In aspects in which the initial resources include more resources than needed to transmit the data, the transmit-only UE may perform a down selection of the resources by randomly selecting a subset of the initial resources. The subset may include the number of resources desired to transmit the data.

If, at 416, it is determined that the RRP operation is triggered, the operation flow/algorithmic structure 400 may advance to requesting the gNB to perform the RRP operation at 424. The request transmitted to the gNB may include information about the initial resources selected, sidelink data to be transmitted, UE information, or timing of the transmission. The request may include one or more of the following contents: a resource pool index for the selected resources; a slot index of the selected resources (time-domain information); a sub channel index and number of subchannels of each selected resource (frequency-domain information); a periodicity of the selected resources (time-domain information); a data priority of the sidelink transmission; an indication of whether the request is for a resource reevaluation or a preemption check; location information of the UE (for example, a zone ID of the transmit-only UE); or additional information (for example, a time by which the results from the RRP are to be received).

The zone ID is typically used together with a communication range to determine whether sidelink hybrid automatic repeat request (HARQ) feedback is needed for a sidelink group cast. A transmitting UE may send a zone ID and a receiving UE may calculate the distance between the two UEs. If the distance is larger than a communication range requirement, no HARQ feedback may be necessary. In aspects of the present disclosure, if the zone ID is used for location information of the UE, it may be decoupled from the communication range feature with which it is typically used.

The request may be transmitted in a physical uplink control channel (PUCCH) (for example, a scheduling request (SR) or a buffer status report (BSR)), a physical uplink shared channel (PUSCH), an RRC message, or a MAC CE.

The operation flow/algorithmic structure 400 may further include, at 428, receiving an indication of updated resources from the RRP operation. The indication of the updated resources may indicate whether the initial resources are available or unavailable. Thus, the updated resources may include some or all of the initial resources. This indication of the updated resources may be conveyed in any of a number of ways.

In a first option, the indication may include an indicator of the available/unavailable resources for all the selected resources. For example, if the transmit-UE initially selects three resources, the indication may be a single-bit indication that indicates whether all three resources are available or not.

In a second option, the indication may include an indicator of available/unavailable resources for individual resources of the selected resources. For example, if the transmit-only UE initially selects three resources, the indication may include three bits, with each bit providing an indication of whether a corresponding initial resource is available or unavailable.

In a third option, the indication may include an indicator of available/unavailable resources for each period. The period may be based on a resource periodicity of a selected resource. For example, if the UE selects resources with a 100-slot periodicity (for example, slots 10, 110, 210, 310 . . . ), the gNB may provide an indicator to indicate which periods include available/unavailable resources (for example, resources in the first (slot 10), third (slot 210), and fourth periods (slot 310) are available, while resources in the second period (slot 110) are not available).

The operation flow/algorithmic structure 400 may further include, at 432, transmitting data using the updated resources. In aspects in which the updated resources include more resources than needed to transmit the data, the transmit-only UE may perform a down selection of the resources by randomly selecting a subset of the updated resources. The subset may include the number of resources desired to transmit the data.

If the resources initially selected are not available (for example, all the initial resources are not available to be used as the updated resources), the transmit-only UE may stop the sidelink transmission and either perform a random resource reselection or request another gNB-assisted RRP operation. In essence, the operation flow/algorithmic structure 400 may loop back to block 412.

If only a subset of the resources initially selected are available to be used as the updated resources, the transmit-only UE may transmit the sidelink data on the available/updated resources and may not transmit sidelink data on the unavailable resources. In the event the available/updated resources do not include a sufficient number of resources for transmission of the sidelink data, additional resources may be randomly selected as needed.

In the event no RRP results are received, the transmit-only UE may proceed to transmit the sidelink data on the initial resources or, alternatively, send an additional request to the gNB for the gNB-assisted RRP. This action may be based on configuration of the UE or the resource pool.

In some aspects, the performing of the initial resource selection at 412 may be performed after the determination of whether the RRP is triggered at 416. This may allow an adjustment of the selection window used in the initial resource selection based on whether the RRP operation is triggered or not. For example, if the RRP is triggered, the transmit-only UE may use a larger (or later) resource selection window (for example, window from which the resources are selected) than a situation in which the RRP is not triggered. Thus, the starting/ending time of the resource selection window may depend on whether RRP is triggered or not.

Figure 5:
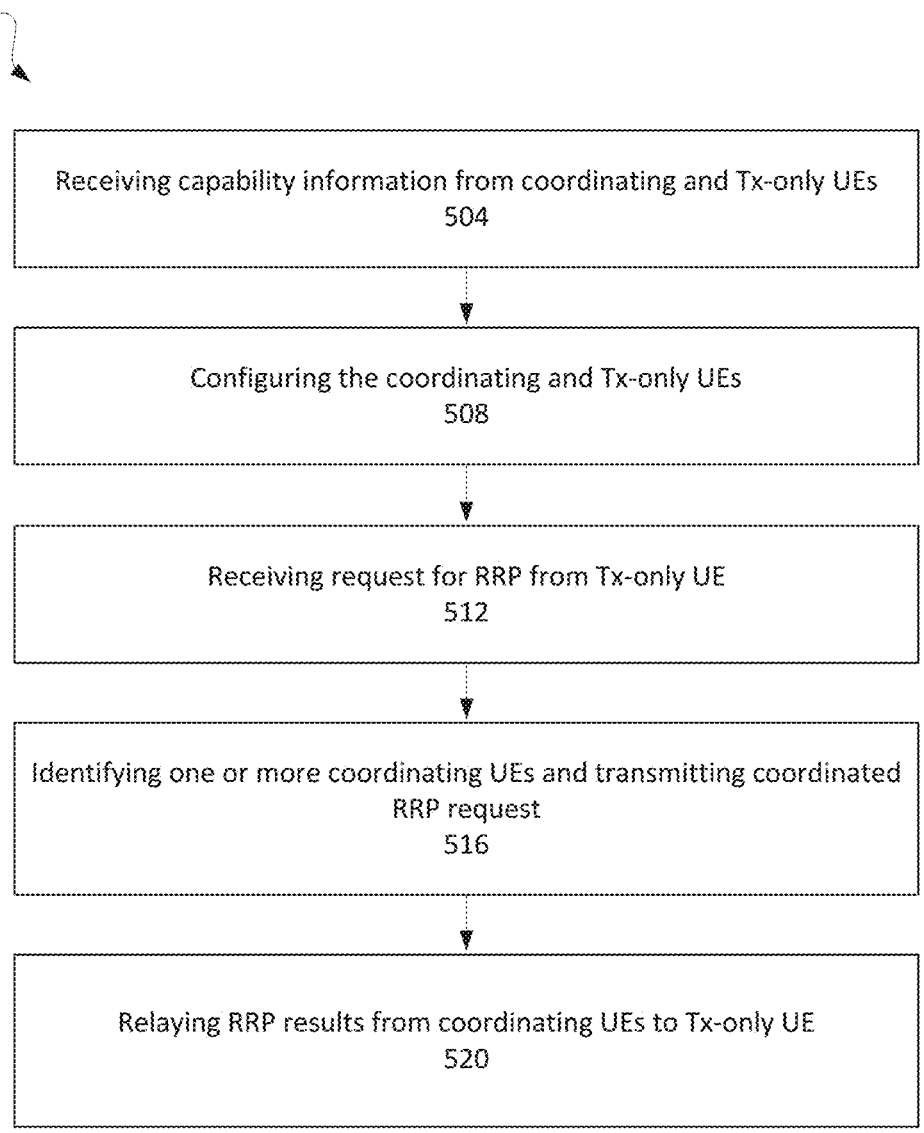
FIG. 5 illustrates another operational flow/algorithmic structure in accordance with some aspects.

FIG. 5 illustrates an operation flow/algorithmic structure 500 in accordance with some aspects. The operation flow/algorithmic structure 500 may be performed or implemented by a gNB such as, for example, base station 108 or gNB 1400; or components thereof, for example, baseband processor 1404A.

The operation flow/algorithmic structure 500 may include, at 504, receiving capability information from coordinating and transmit-only UEs. The capability information may be received as a result of an initial connection procedure, a periodic update (for example, a connection reconfiguration), or based on a request sent by the gNB.

UEs capable of both transmitting and receiving on a sidelink and, potentially, having sufficient platform resources to accommodate coordinating RRP operations, may provide an indication that the UE is capable of operating as a coordinating UE. UEs having only transmit capabilities or, potentially, operating in a transmit-only mode, may provide an indication that they are transmit-only UEs.

The operation flow/algorithmic structure 500 may further include, at 508, configuring the coordinating and transmit-only UEs. The configuration at 508 may include indications to the UEs that they are to operate in the coordinating or transmit-only roles. In some instances, the configuration at 508 may include configuring a transmit-only UE with a resource pool that indicates the gNB is able to assist with RRP.

In some situations, the gNB may configure the UEs (either coordinating or transmit-only UEs) for gNB-assisted RRP based on subscription information associated with the UEs. For example, a transmit-only UE may be associated with the subscription service that enables the gNB-assisted RRP feature. The gNB may verify the subscription settings before providing the configuration information to the transmit-only UE.

The operation flow/algorithmic structure 500 may further include, at 512, receiving a request for an RRP operation from the transmit-only UE. The request may include content information such as that described above with respect to the request at 424 of FIG. 4.

The operation flow/algorithmic structure 500 may further include, at 516, identifying one or more coordinating UEs and transmitting a coordinated RRP request to the identified coordinating UEs. The gNB may identify coordinating UEs based on a coordinating UEs capability or location. For example, it may be desirable for coordinating UEs that are proximate to the transmit-only UE to assist with the RRP operation. Proximity may be determined by both UEs being in a same zone or sector, or may be determined if the UEs location information is sufficient to determine they are within a predetermined distance from one another. Each coordinating UE may have different capabilities including, for example, processing times associated with various RRP operations. In some situations, the gNB may select a coordinating UE based on a processing time constraint received from the transmit-only UE or based on other criteria.

The coordinated RRP request sent to the identified coordinating UEs may be the same as or based on the RRP request received from the transmit-only UE. In some scenarios, the coordinated RRP request may include a subset of the information from the transmit-only UE's RRP request.

The operation flow/algorithmic structure 500 may further include, at 520, relaying the RRP results from coordinating UEs to the transmit-only UE. The relaying of the RRP results may include receiving the RRP results from the coordinating UEs and sending the RRP results to the transmit-only UE.

The results received from the coordinating UE may include an indicator of available/unavailable resources for all selected resources, for each of the selected resources, or for each period as described above with respect to FIG. 4. In some situations, the gNB may simply forward the RRP results to the transmit-only UE. In other situations, the gNB may augment, modify, verify, or alter the RRP results before transmitting to the transmit-only UE.

In some instances, the results may be forwarded to the transmit-only UE based on the processing time of the transmit-only UE. For example, if it is within the processing time of the transmit-only UE (for example, processing constraints indicated by the transmit-only UE), the gNB may send the RRP results to the transmit-only UE. Otherwise, the gNB may not send the results.

Figure 6:
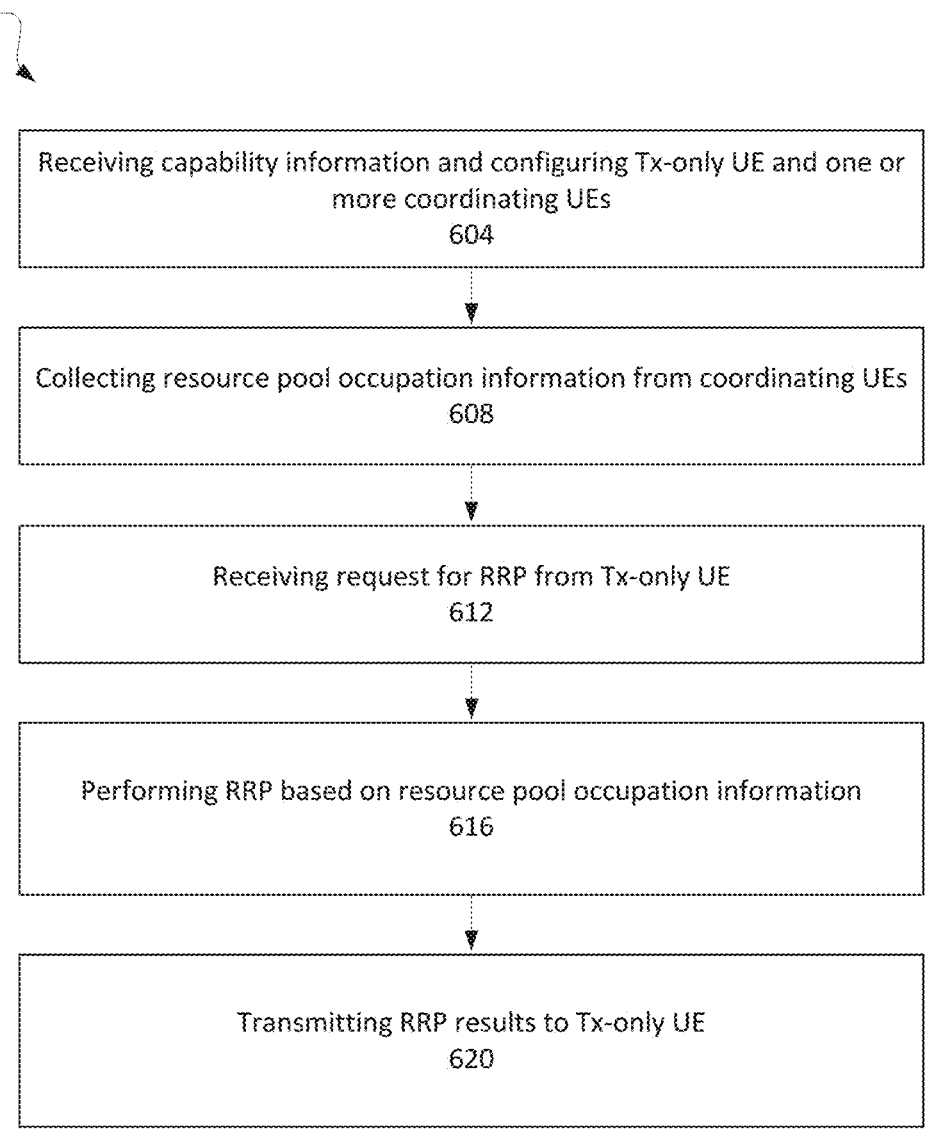
FIG. 6 illustrates another operational flow/algorithmic structure in accordance with some aspects.

FIG. 6 illustrates an operation flow/algorithmic structure 600 in accordance with some aspects. The operation flow/algorithmic structure 600 may be performed or implemented by a gNB such as, for example, base station 108 or gNB 1400; or components thereof, for example, baseband processor 1404A.

The operation flow/algorithmic structure 600 may include, at 604, receiving capability information from UEs and configuring a transmit-only UE and one or more coordinating UEs. Receipt of the capability information and configuration of the coordinating and transmit-only UEs may be similar to that described above with respect to blocks 504 and 508 of FIG. 5.

The operation flow/algorithmic structure 600 may further include, at 608, collecting resource pool occupation information from one or more coordinating UEs. The coordinating UEs may be configured to transmit resource pool occupation information to the gNB to enable the gNB to have an accurate view of the current state of the resource pool. The gNB may maintain a resource map with the current state of the resource pool. The resource pool occupation information received from the coordinating UEs may include information as to sensed energy levels (or related channel metrics) for each of the resources of the resource pool or reservation information. The reservation information may include an indication of the reserved resources and data priority associated with the reservation.

If the gNB receives the resource pool occupation information from more than one UE, it may bias the received information toward a coordinating UE that is closest to the transmit-only UE. For example, if two different energy levels are detected for a particular resource, the energy level as seen by a coordinating UE closest to the transmit-only UE may be used.

The operation flow/algorithmic structure 600 may further include, at 612, receiving a request for RRP from the transmit-only UE. The request may include some or all of the content information described above with respect to FIG. 4.

The operation flow/algorithmic structure 600 may further include, at 616, performing the RRP based on the resource pool occupation information. The base station may use the resource map to perform a resource reevaluation similar to that described above with respect to FIG. 2 or resource preemption similar to that described above with respect to FIG. 3 based on the resource map.

The operation flow/algorithmic structure 600 may further include, at 620, transmitting the RRP results to the transmit-only UE. Transmission of the RRP results may be similar to that described above with respect to block 520 of FIG. 5.

Figure 7:
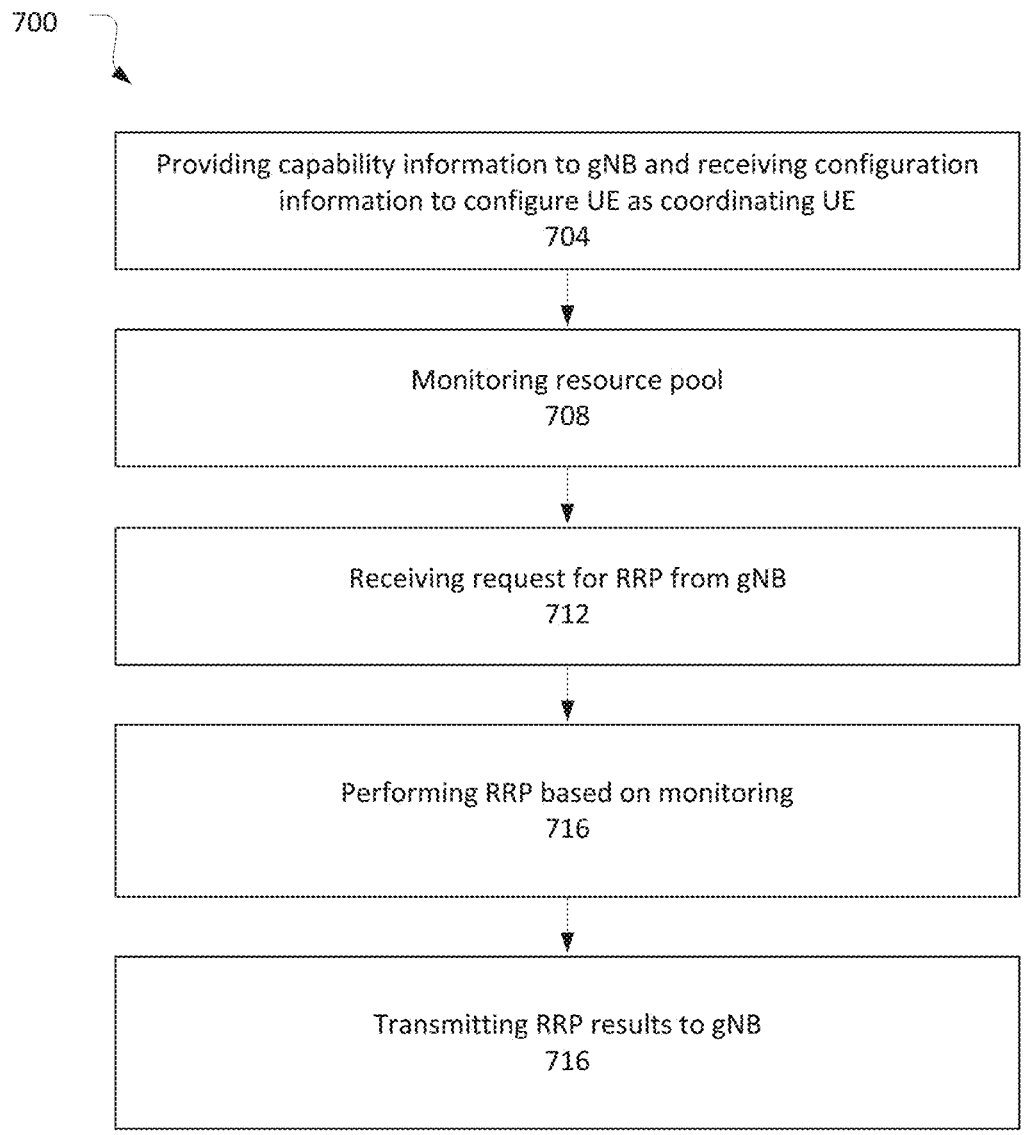
FIG. 7 illustrates another operational flow/algorithmic structure in accordance with some aspects.

FIG. 7 illustrates an operation flow/algorithmic structure 700 in accordance with some aspects. The operation flow/algorithmic structure 700 may be performed or implemented by a coordinating UE such as, for example, UE 102, or 1300; or components thereof, for example, baseband processor 1304A.

The operation flow/algorithmic structure 700 may include, at 704, providing capability information to a gNB and receiving configuration information from the gNB to configure the UE as a coordinating UE. Providing the capability information and receiving the configuration information may be similar to that described above with respect to block 504 of FIG. 5.

The operation flow/algorithmic structure 700 may further include, at 708, monitoring the resource pool. The resource pool may be indicated by the configuration information received from the gNB or from a subsequent instruction. The monitoring may include sensing the resources of the resource pool and decoding control information to track reservation information with respect to the resources of the resource pool.

The operation flow/algorithmic structure 700 may further include, at 712, receiving a request for RRP from the gNB. The request may include some or all of the request content discussed above with respect to block 424 of FIG. 4.

The operation flow/algorithmic structure 700 may further include, at 716, transmitting the RRP results to the gNB. Transmission of the RRP results may be similar to that described above with respect to block 520 of FIG. 5.

Figure 8:
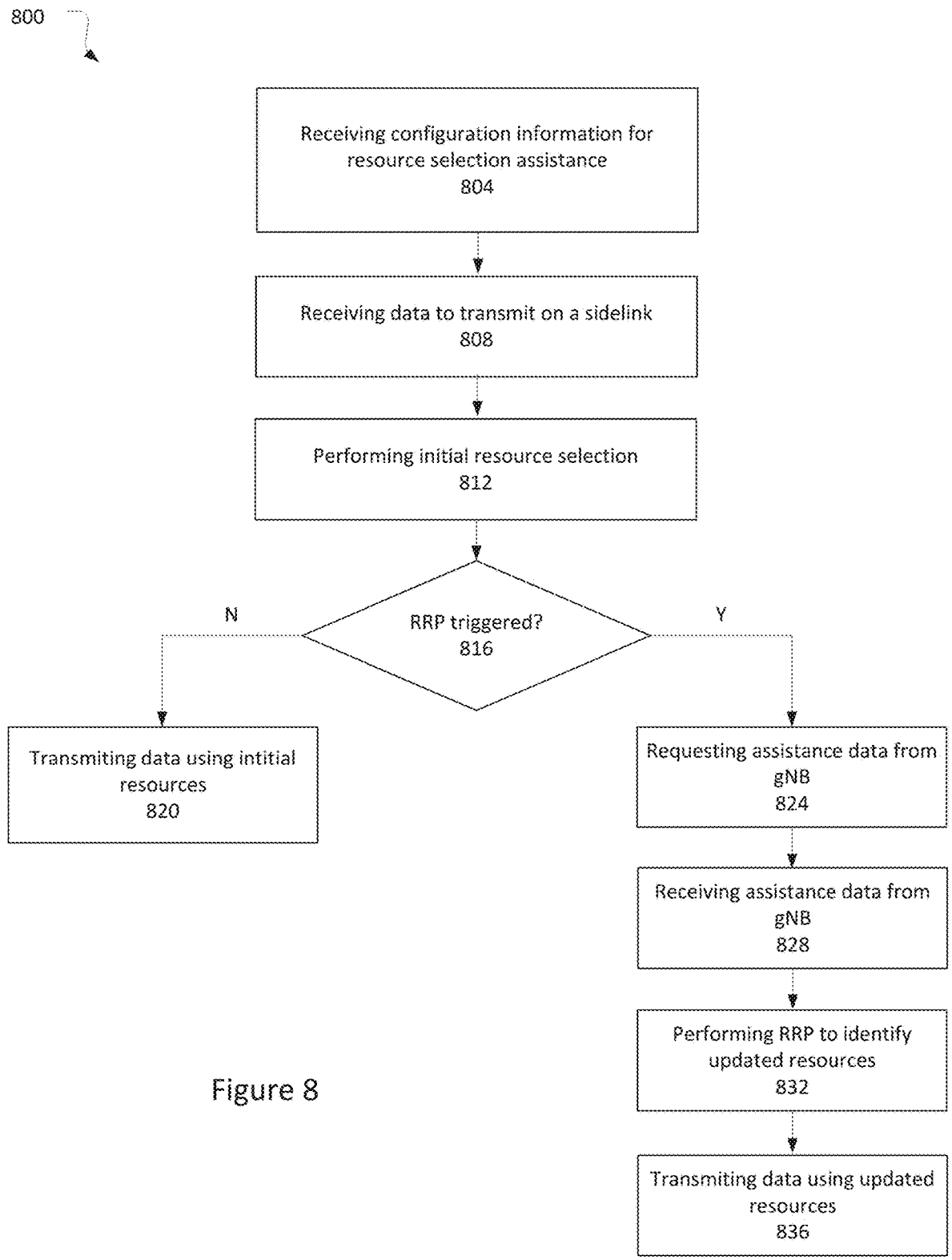
FIG. 8 illustrates another operational flow/algorithmic structure in accordance with some aspects.

FIG. 8 illustrates an operation flow/algorithmic structure 800 in accordance with some aspects. The operation flow/algorithmic structure 800 may be performed or implemented by transmit-only UE such as, for example, UE 104 or 1300; or components thereof, for example, baseband processor 1304A.

The operation flow/algorithmic structure 800 may include, at 804, receiving configuration information for resource selection assistance. Configuration of the transmit-only UE for resource selection assistance may be similar to configuring the transmit-only UE for gNB-based RRP described above with respect to block 404 of FIG. 4. In particular, in accordance with one example, the UE may receive a resource pool configuration that indicates a resource selection assistance feature is enabled.

The operation flow/algorithmic structure 800 may further include, at 808, receiving data to transmit on a sidelink, which may be similar to that described above with respect to block 408 of FIG. 4.

The operation flow/algorithmic structure 800 may further include, at 812, performing an initial resource selection, which may be similar to that described above with respect to block 412 of FIG. 4

The operation flow/algorithmic structure 800 may further include, at 816, determining whether an RRP is triggered, which may be similar to that described above with respect to block 416 of FIG. 4.

If, at 816, it is determined that the RRP is triggered, the operation flow/algorithmic structure 800 may advance to transmitting data using resources from the initial resources at 820, which may be similar to that described above with respect to block 420 of FIG. 4.

If, at 816, it is determined that the RRP is not triggered, the operation flow/algorithmic structure 800 may advance to requesting assistance data from the gNB. In some aspects, the request for assistance data may include some or all of the content included in a request to perform an RRP operation as described above with respect to block 424 of FIG. 4.

The operation flow/algorithmic structure 800 may further include, at 828, receiving the assistance data from the gNB. The assistance data may include information similar to some or all of the resource pool occupation information discussed with respect to block 608 of FIG. 6. For example, the assistance data may include information about sensed energy (or channel quality metrics) and reservations with respect to the resources of the resource pool.

In some instances, once the assistance data is requested from the gNB, the gNB may continue to update the assistance data at various intervals. For example, when new information is received by the gNB, the gNB may provide the new information about the resources of the resource pool to the transmit-only UE.

The operation flow/algorithmic structure 800 may further include, at 832, performing an RRP operation to identify the updated resources. The transmit-only UE may perform the RRP operation based on the assistance data received from the gNB in a manner similar to that described above with respect to block 616 of FIG. 6.

The operation flow/algorithmic structure 800 may further include, at 836, transmitting data using the updated resources, which may be similar to block 432 of FIG. 4.

As described above, a transmit-only UE may randomly select the initial resources at, for example, block 412 of FIG. 4. In other aspects, the transmit-only UE may utilize gNB assistance for the selection of the resources. The selected resources, or portions thereof, may be directly used for transmission of sidelink data, or they may serve as a foundation for further refinement through a gNB-assisted RRP as described above. Operation flows/algorithmic structures described in FIGS. 9-12 describe additional aspects with respect to gNB assistance.

Figure 9:
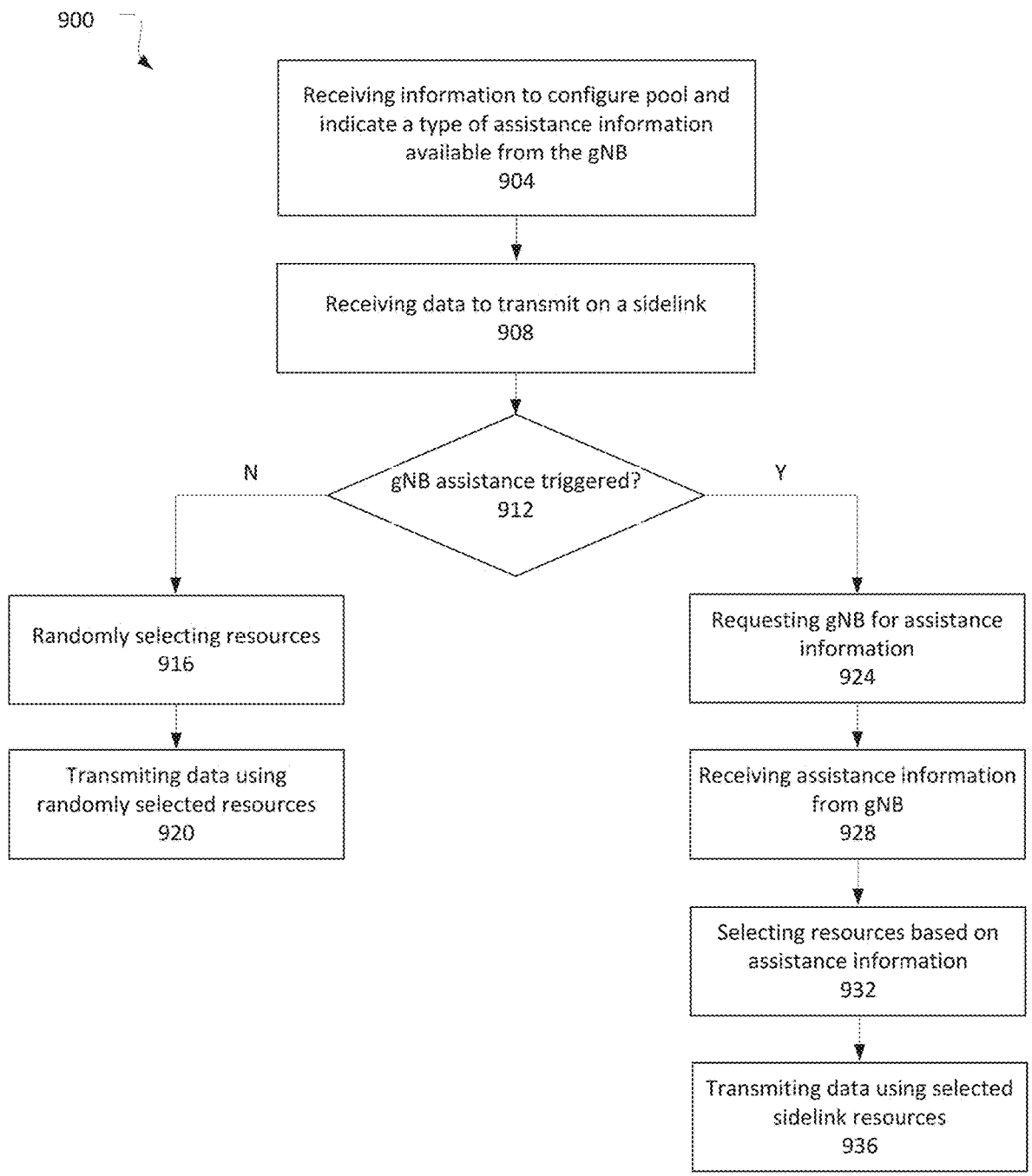
FIG. 9 illustrates another operational flow/algorithmic structure in accordance with some aspects.

FIG. 9 illustrates an operation flow/algorithmic structure 900 in accordance with some aspects. The operation flow/algorithmic structure 900 may be performed or implemented by a transmit-only UE such as, for example, UE 104 or 1300; or components thereof, for example, baseband processor 1304A.

The operation flow/algorithmic structure 900 may include, at 904, receiving information to configure a pool of sidelink resources and to indicate a type of assistance information available from the gNB.

The configuration information may be received by RRC signaling. In some instances, the configuration received at 904 may be in response to a UE capability report previously transmitted to the gNB. For example, the UE may transmit a capability report that indicates the UE is a transmit-only UE. At a later time, the gNB may transmit the configuration information that configures the UE with the indication of the type of assistance information available from the gNB.

In some aspects, the information received at 904 may be received in one or more configuration messages. For example, the resource pool may be configured separately from the indication of the type of assistance information available from the gNB. Further, in some instances, the resource pool may be predefined.

The operation flow/algorithmic structure 900 may further include, at 908, receiving data to transmit on a sidelink. The data may be received at one component of the UE (for example, baseband processing circuitry) from another component of the UE (for example, a central processing unit (CPU) processing circuitry). In some aspects, the data may be associated with a priority that is based on the content of the data.

The operation flow/algorithmic structure 900 may further include, at 912, determining whether gNB assistance is triggered. In some aspects, the gNB assistance may be triggered based on the data that is to be transmitted, the configured resources, or status of the transmit-only UE. A number of examples are provided below for triggering the gNB assistance. These examples are not exclusive of one another. For example, one or more of the examples may be combined and collectively serve as a basis for triggering the gNB assistance.

In a first example, the gNB assistance may be triggered based on a priority of the sidelink data to be transmitted. In particular, the gNB assistance may be triggered for relatively high priority sidelink data, and may not be triggered for relatively low priority sidelink data. Determining whether the priority of the sidelink data is sufficient to trigger the gNB assistance may be based on comparing the priority to a predefined data priority threshold. The data priority threshold may be configured by the gNB or statically defined in a 3GPP TS.

In a second example, the gNB assistance may be triggered based on a PDB of the sidelink data to be transmitted. If the sidelink data has a relatively large PDB, it may be acceptable to take any extra time that may be necessary to obtain the gNB assistance, which may also provide a higher likelihood that no collision will occur. So, in accordance with some aspects, if the PDB of the sidelink data is larger than a predetermined threshold, the gNB assistance may be triggered. Otherwise, the gNB assistance may not be triggered. The predetermined threshold may be configured by the gNB or statically defined by a 3GPP TS.

In a third example, the gNB assistance may be triggered based on a periodicity of the sidelink data to be transmitted. For example, periodic sidelink data may trigger the gNB assistance while aperiodic sidelink data may not.

In a fourth example, the gNB assistance may be triggered based on a capability or service subscription of the UE. For example, the transmit-only UE may need to subscribe to a particular service level in order to obtain the gNB assistance. In some situations, the UE may need to be initially configured for the services.

In a fifth example, the gNB assistance may be triggered based on a configuration or preconfiguration of the resource pool itself. For example, gNB assistance may only be available for resource pools having a particular requirement/configuration. In some situations, resource pools associated with certain bandwidths, frequency ranges, etc. may be available or unavailable for gNB assistance.

If, at 912, it is determined that the gNB assistance is not triggered, the operation flow/algorithmic structure 900 may advance to randomly selecting resources at 916. The resources may be randomly selected from the configured pool of sidelink resources. As described above, the amount of resources selected may be equal to or greater than the amount of resources needed for transmitting the data.

The operation flow/algorithmic structure 900 may further include, at 920, transmitting the sidelink data using the randomly selected resources. In the event the randomly selected resources include more resources than needed for the transmission, the transmit-only UE may downselect the resources to use only those needed for transmission.

If, at 912, it is determined that the gNB assistance is triggered, the operation flow/algorithmic structure 900 may advance to requesting the gNB for the assistance information at 924. The request transmitted to the gNB may include information about the sidelink data to be transmitted, resource pool, UE information, or timing of the sidelink transmission (or requested information).

The request may include one or more of the following contents: a resource selection window (to indicate a window in which potential sidelink resources are of interest); a sensing window (to indicate a window in which energy levels of the potential sidelink resources are to be sensed); a latency requirement of the assistance information (for example, a time by which the assistance information is requested); a data priority of the sidelink transmission; an identifier of the resource pool (for example, a resource pool index); location information of the UE (for example, a zone ID of the transmit-only UE); or a number of resources desired for the sidelink transmission.

The request may be transmitted in a physical uplink control channel (PUCCH) (for example, a scheduling request (SR) or a buffer status report (BSR)), a physical uplink shared channel (PUSCH), an RRC message, or a MAC CE.

The operation flow/algorithmic structure 900 may further include, at 928, receiving the assistance information from the gNB. The assistance information may include information about various resources of the resource pool including, for example: sensed energy (for example, RSRP levels or other channel metrics); resource reservation status; or availability/unavailability.

The assistance information may include a resource map having information on individual resources or groups of resources in, for example, the time or frequency domain. For example, in one option, the resource map may include one bitmap that indicates whether individual resources of the resource pool are available or unavailable. The bitmap may be a two-dimensional bitmap with one dimension providing information about time-domain categories (for example, which slots have availability) and one dimension providing information about frequency-domain categories (for example, which subchannels have availability). Each bit of the bitmap may indicate whether a resource (for example, a slot and subchannel) is available.

In some situations, the assistance information may include either a set of available resources or a set of unavailable resources.

The operation flow/algorithmic structure 900 may further include, at 932, selecting resources based on the assistance information. The transmit-only UE may perform a resource selection based on the assistance information as follows in accordance with some examples.

In a first example, if the assistance information includes a resource map with additional information (for example, RSRP levels or reservation statuses), the transmit-only UE may select available resources based on the additional information. For example, the transmit-only UE may select the available resources that have the lowest RSRP levels and are not reserved.

In a second example, if the assistance information includes a resource map without additional information (for example, the resource map only indicates whether individual resources are available or unavailable), the transmit-only UE may randomly select a desired number of resources from the set of resources indicated as available.

In a third example, if the assistance information includes an indication of a set of available resources (in a manner other than the resource map), the transmit-only UE may randomly select a desired number of resources from the set of resources indicated as available.

In a fourth example, if the assistance information includes an indication of a set of unavailable resources (in a manner other than the resource map), the transmit-only UE may randomly select the desired number of resources from the complement of the set of unavailable resources.

The operation flow/algorithmic structure 900 may further include, at 936, transmitting data using the selected sidelink resources.

Figure 10:
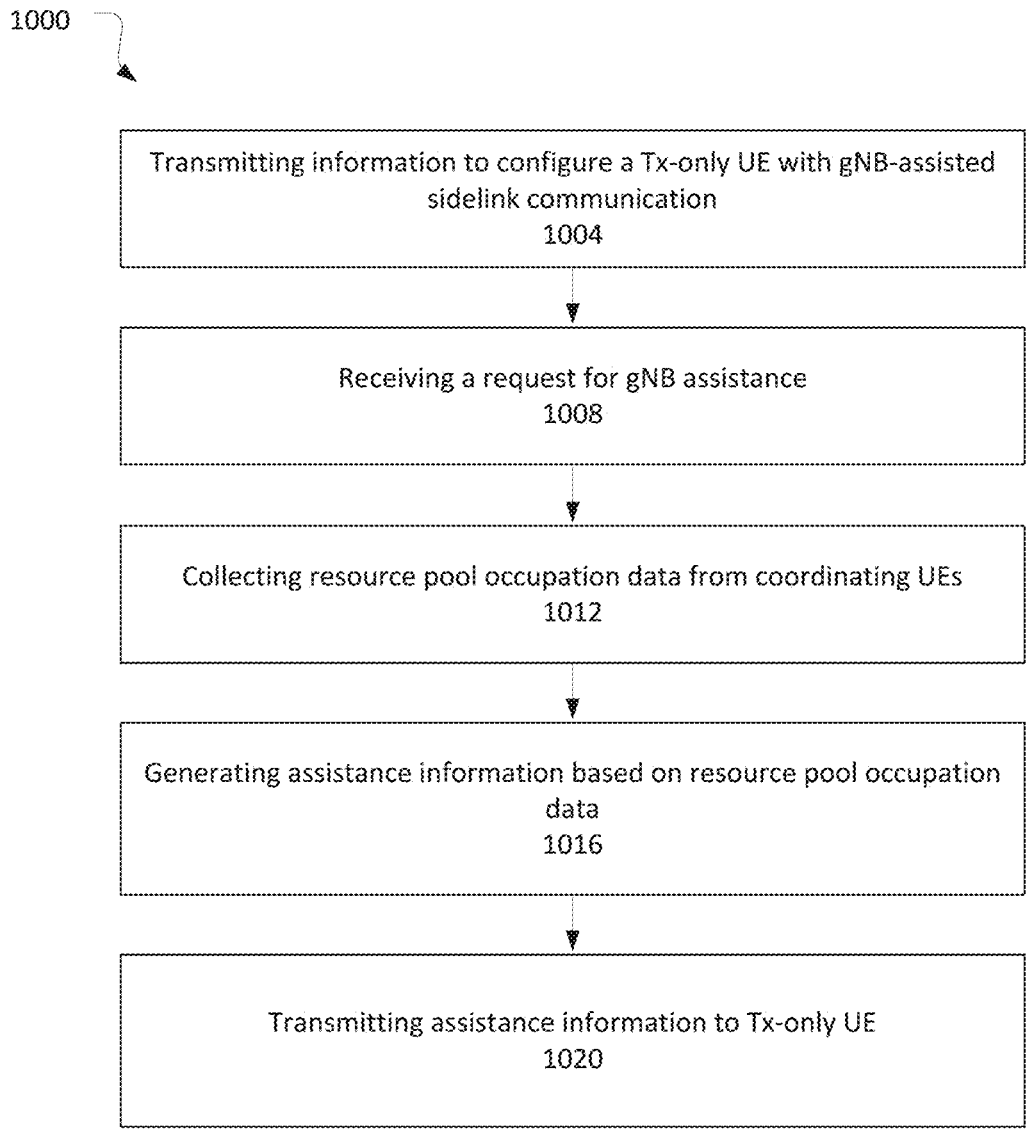
FIG. 10 illustrates another operational flow/algorithmic structure in accordance with some aspects.

FIG. 10 illustrates an operation flow/algorithmic structure 1000 in accordance with some aspects. The operation flow/algorithmic structure 1000 may be performed or implemented by a gNB such as, for example, base station 108 or gNB 1400; or components thereof, for example, baseband processor 1404A.

The operation flow/algorithmic structure 1000 may correspond to a reactive gNB approach in which the gNB provides assistance information upon a request from the transmit-only UE.

The operation flow/algorithmic structure 1000 may include, at 1004, transmitting information to configure a transmit-only UE with gNB-assisted sidelink communication. In some embodiments, the information transmitted at 1004 may be based on UE capability information previously received. For example, the UE capability information may indicate that the UE is a transmit-only UE or is operating in a transmit-only UE mode.

The information transmitted at 1004 may configure the transmit-only UE with an indication of a type of assistance information that the gNB can provide to assist with sidelink resource selection for a pool of sidelink resources. In some embodiments, the information transmitted at 1004 may include configuration information of the pool of sidelink resources. The information may be transmitted in one or more RRC configuration messages.

The operation flow/algorithmic structure 1000 may further include, at 1008, receiving a request for gNB assistance. The request for gNB assistance may include information about a resource pool in which the resources are to be selected; sidelink data to be transmitted, the UE, or timing of the transmission. The request may include one or more of the following contents: a resource pool index; a periodicity of the sidelink data; a priority of the sidelink data; location information of the UE (for example, a zone ID of the transmit-only UE); or additional information (for example, a time by which the assistance information from the gNB is requested to be received).

The operation flow/algorithmic structure 1000 may further include, at 1012, collecting resource pool occupation data from coordinating UEs. The coordinating UEs may be configured to transmit resource pool occupation information to the gNB to enable the gNB to have an accurate view of the current state of the resource pool. The coordinating UEs may be configured similar to that described above with respect to block 604 of FIG. 6, for example.

The gNB may maintain a resource map with the current state of the resource pool. The resource pool occupation information received from the coordinating UEs may include information as to sensed energy levels (or related channel metrics) for each of the resources of the resource pool or reservation information. The reservation information may include an indication of the reserved resources and data priority associated with the reservation.

The operation flow/algorithmic structure 1000 may further include, at 1016, generating assistance information based on the resource pool occupation data and the request.

The assistance information may be based on a location of the UE as provided by the request or otherwise determined. For example, the gNB may select resource pool occupation data from coordinating nodes that are in a desired proximity to the transmit-only UE.

The assistance information may be generated based on priority or periodicity of the sidelink data that is to be transmitted. The gNB may use priority or periodicity to determine a range of sidelink resources that may be of interest to the transmit-only UE for transmitting the sidelink data.

The assistance information may be generated based on a configuration of the resource pool itself. For example, the resource pool may be prioritized for reduced-sensing resource allocation (in which only a subset of the resources of the resource pool are sensed) or for full-sensing resource allocation (in which all the resources of the resource pool are sensed). In some examples, some portions of a resource pool may be prioritized for reduced-sensing resource allocation, while other portions of the resource pool may be prioritized for a full-sensing resource allocation. The portions may correspond to frequency-domain portions (for example, a number of subchannels).

When generating the assistance information, the gNB may provide more sensing results for resources being prioritized for full-sensing resource allocation then for resources being prioritized for reduced-sensing resource allocation.

In various aspects, the generated assistance information may provide sensed data with respect to a frequency domain over a period of time (for example, a sensing window). The granularity of the sensing window may be based on resource pool occupation data received from coordinating UEs and may be adjusted in some scenarios. For example, in the event the data is high-priority, a larger sensing window may be used in order to provide more sensing results, which may convey a more accurate state of the frequency resource.

The operation flow/algorithmic structure 1000 may further include, at 1020, transmitting assistance information to the transmit-only UE. The assistance information may be transmitted as a two-dimensional resource map. In some situations, the assistance information may be focused on the portions of the resource pool prioritized for the transmit-only UE. For example, the assistance information may only cover frequency domains (for example, subchannels) preferred for the transmit-only UE.

Figure 11:
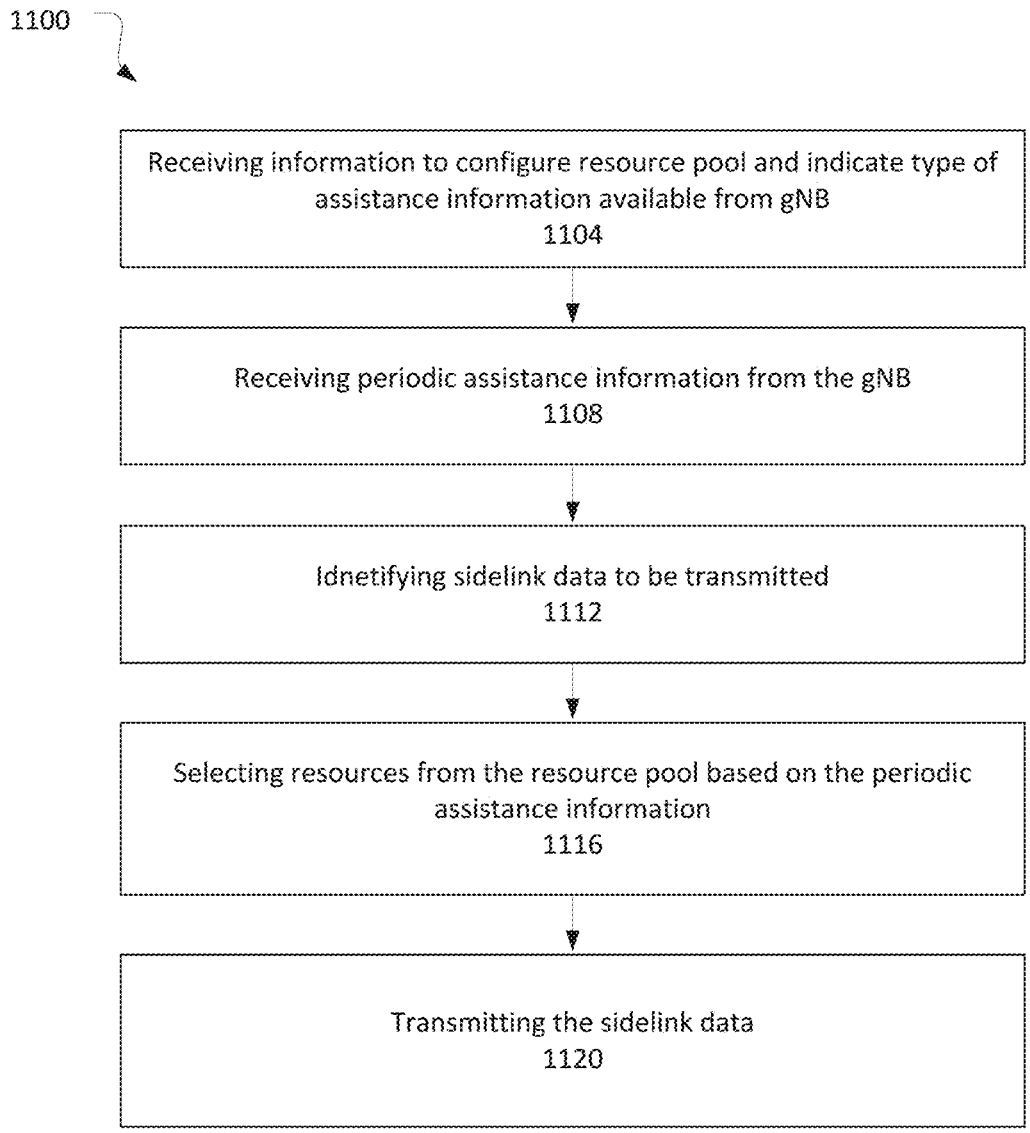
FIG. 11 illustrates another operational flow/algorithmic structure in accordance with some aspects.

FIG. 11 illustrates an operation flow/algorithmic structure 1100 in accordance with some aspects. The operation flow/algorithmic structure 1100 may be performed or implemented by a transmit-only UE such as, for example, UE 104 or 1300; or components thereof, for example, baseband processor 1304A.

The operation flow/algorithmic structure 1100 may include, at 1104, receiving information to configure the resource pool and indicate a type of assistance information available from a gNB. The type of assistance information available from the gNB may be periodic assistance data and it may be based on a service subscription of the transmit-only UE. This configuration information may be received as one or more RRC messages as described above with respect to block 1004 of FIG. 10, for example.

The operation flow/algorithmic structure 1100 may further include, at 1108, receiving periodic assistance information from the gNB. The periodic assistance information may include availability, RSRP level, or reservation information corresponding to individual resources, slots, or subchannels. The periodic assistance information may include a resource map to indicate available/unavailable resources and, optionally, additional information such as RSRP levels or reserved statuses; an indication of a set of available resources; or an indication of a set of unavailable resources.

In some instances, the periodic assistance information may include a plurality of resource maps, with individual resource maps corresponding to different data priorities. This may allow the UE to select the appropriate resource map based on data priority. This may be especially useful when the gNB provides periodic assistance information and has no knowledge of the priority of the data to be transmitted. Although in some instances, the assistance information provided in the reactive scenarios may also include resource maps corresponding to different data priorities.

The operation flow/algorithmic structure 1100 may further include, at 1112, identifying sidelink data to be transmitted. The sidelink data may be received (and identified) by one component of the UE, for example, baseband processing circuitry, from another component of the UE, for example, CPU processing circuitry.

The operation flow/algorithmic structure 1100 may further include, at 1116, selecting resources from the resource pool based on the periodic assistance information. The UE may select resources from the pool of sidelink resources based on RSRP level or reservation information for individual resources, slots, or subchannels of the pool as provided in the assistance information. The selection may additionally be based on information associated with the data, for example, priority or periodicity. In general, the selection of the resources may be similar to that described above with respect to block 932 of FIG. 9.

The operation flow/algorithmic structure 1100 may further include, at 1120, transmitting the sidelink data using selected sidelink resources. The transmission of the sidelink data may be similar to that described above with respect to block 936 of FIG. 9, for example.

Figure 12:
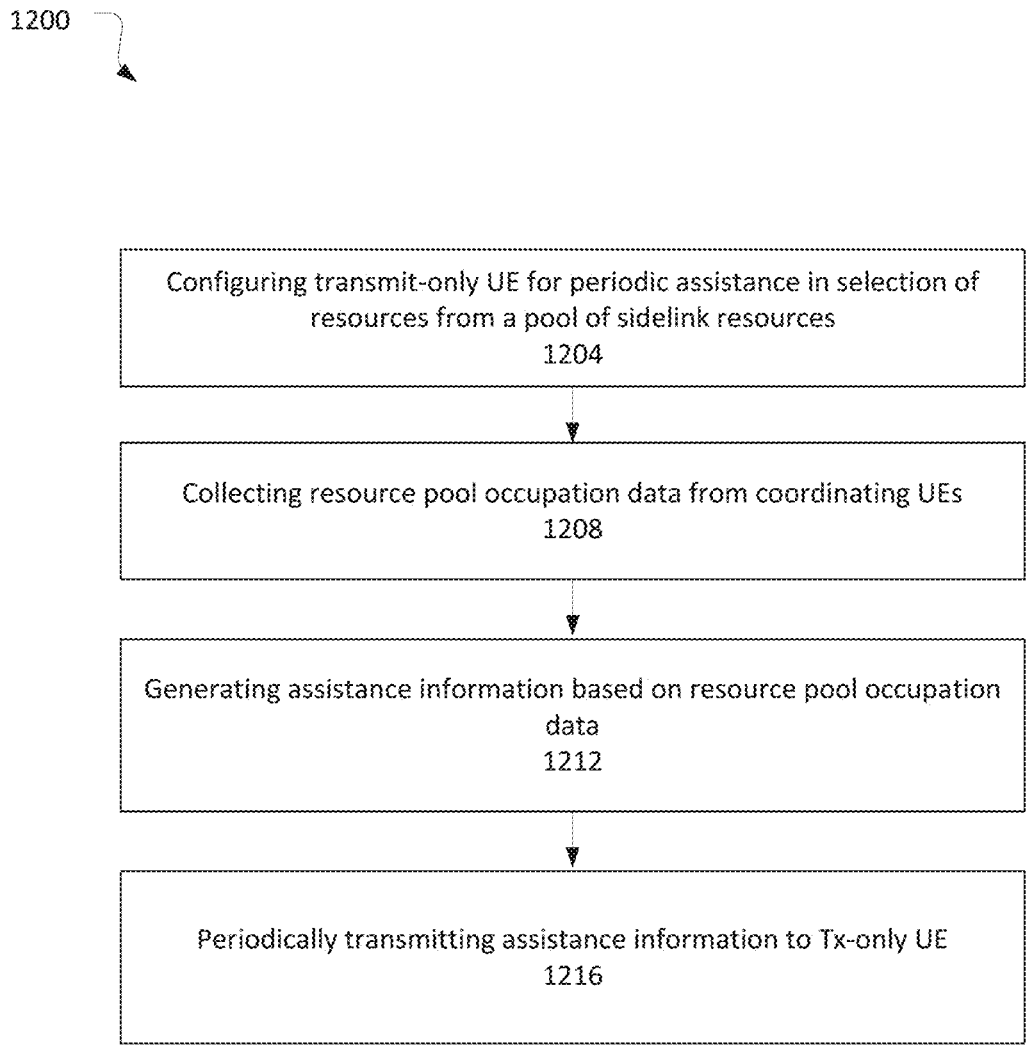
FIG. 12 illustrates another operational flow/algorithmic structure in accordance with some aspects.

FIG. 12 illustrates an operation flow/algorithmic structure 1200 in accordance with some aspects. The operation flow/algorithmic structure 1200 may be performed or implemented by a gNB such as, for example, base station 108 or gNB 1400; or components thereof, for example, baseband processor 1404A.

The operation flow/algorithmic structure 1200 may correspond to a proactive gNB approach in which the gNB periodically provides assistance information to the transmit-only UE, without relying upon a request from the transmit-only UE.

The operation flow/algorithmic structure 1200 may include, at 1204, configuring a transmit-only UE for periodic assistance in selection of resources from a pool of sidelink resources. The UE may be configured for periodic assistance by the gNB transmitting information similar to that described above with respect to block 1004 of FIG. 10.

The operation flow/algorithmic structure 1200 may further include, at 1208, collecting resource pool occupation data from coordinating UEs. Collection of the resource pool occupation data may be similar to that described above with respect to block 1012 of FIG. 10.

The operation flow/algorithmic structure 1200 may further include, at 1212, generating assistance information based on resource pool occupation data. Generating assistance information may be similar to that described above with respect to block 1016 of FIG. 10. The assistance information may include availability/unavailability, RSRP levels, or reservation information with respect to individual resources, slots, or subchannels.

The operation flow/algorithmic structure 1200 may further include, at 1216, periodically transmitting assistance information to the transmit-only UE. In general, transmission of the assistance information may be similar to that described above with respect to 1020. However, in this situation, the assistance information may be transmitted periodically instead of based on a specific request from the transmit-only UE. The periods in which the assistance information are transmitted may be updated based on a number of different scenarios. For example, the periods in which the assistance information are transmitted may be based on a change in the channel quality or reservation status as determined from collected resource pool occupation data.

Figure 13:
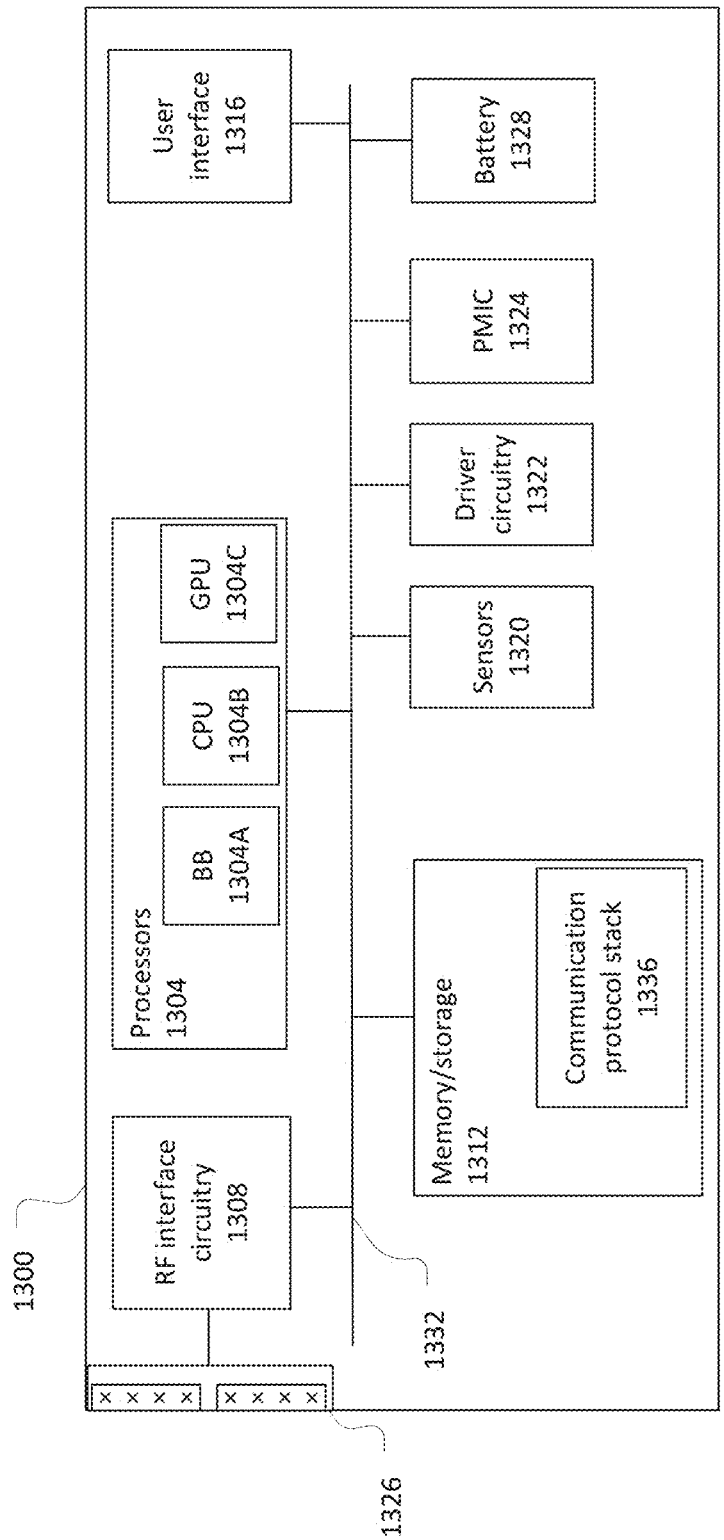
FIG. 13 illustrates a user equipment in accordance with some aspects.

FIG. 13 illustrates a UE 1300 in accordance with some aspects. The UE 1300 may be similar to and substantially interchangeable with UEs 102, 104, or 106.

The UE 1300 may be any mobile or non-mobile computing device, such as, for example, mobile phones, computers, tablets, industrial wireless sensors (for example, microphones, carbon dioxide sensors, pressure sensors, humidity sensors, thermometers, motion sensors, accelerometers, laser scanners, fluid level sensors, inventory sensors, electric voltage/current meters, actuators, etc.), video surveillance/monitoring devices (for example, cameras, video cameras, etc.), wearable devices (for example, a smart watch), relaxed-IoT devices, proximity sensors, vehicle-based UEs, infrastructure-based UEs.

The UE 1300 may include processors 1304, RF interface circuitry 1308, memory/storage 1312, user interface 1316, sensors 1320, driver circuitry 1322, power management integrated circuit (PMIC) 1324, antenna structure 1326, and battery 1328. The components of the UE 1300 may be implemented as integrated circuits (ICs), portions thereof, discrete electronic devices, or other modules, logic, hardware, software, firmware, or a combination thereof. The block diagram of FIG. 13 is intended to show a high-level view of some of the components of the UE 1300. However, some of the components shown may be omitted, additional components may be present, and different arrangement of the components shown may occur in other implementations.

The components of the UE 1300 may be coupled with various other components over one or more interconnects 1332, which may represent any type of interface, input/output, bus (local, system, or expansion), transmission line, trace, optical connection, etc. that allows various circuit components (on common or different chips or chipsets) to interact with one another.

The processors 1304 may include processor circuitry such as, for example, baseband processor circuitry (BB) 1304A, central processor unit circuitry (CPU) 1304B, and graphics processor unit circuitry (GPU) 1304C. The processors 1304 may include any type of circuitry or processor circuitry that executes or otherwise operates computer-executable instructions, such as program code, software modules, or functional processes from memory/storage 1312 to cause the UE 1300 to perform operations as described herein.

In some aspects, the baseband processor circuitry 1304A may access a communication protocol stack 1336 in the memory/storage 1312 to communicate over a 3GPP compatible network. In general, the baseband processor circuitry 1304A may access the communication protocol stack to: perform user plane functions at a PHY layer, MAC layer, RLC layer, PDCP layer, SDAP layer, and PDU layer; and perform control plane functions at a PHY layer, MAC layer, RLC layer, PDCP layer, RRC layer, and a non-access stratum layer. In some aspects, the PHY layer operations may additionally/alternatively be performed by the components of the RF interface circuitry 1308.

The baseband processor circuitry 1304A may generate or process baseband signals or waveforms that carry information in 3GPP-compatible networks. In some aspects, the waveforms for NR may be based cyclic prefix OFDM (CP-OFDM) in the uplink or downlink, and discrete Fourier transform spread OFDM (DFT-S-OFDM) in the uplink.

The memory/storage 1312 may include one or more non-transitory, computer-readable media that includes instructions (for example, communication protocol stack 1336) that may be executed by one or more of the processors 1304 to cause the UE 1300 to perform various operations described herein. The memory/storage 1312 may also store configuration, resource pool, or RRP information as described elsewhere.

The memory/storage 1312 include any type of volatile or non-volatile memory that may be distributed throughout the UE 1300. In some aspects, some of the memory/storage 1312 may be located on the processors 1304 themselves (for example, L1 and L2 cache), while other memory/storage 1312 is external to the processors 1304 but accessible thereto via a memory interface. The memory/storage 1312 may include any suitable volatile or non-volatile memory such as, but not limited to, dynamic random access memory (DRAM), static random access memory (SRAM), eraseable programmable read only memory (EPROM), electrically eraseable programmable read only memory (EEPROM), Flash memory, solid-state memory, or any other type of memory device technology.

The RF interface circuitry 1308 may include transceiver circuitry and radio frequency front module (RFEM) that allows the UE 1300 to communicate with other devices over a radio access network. The RF interface circuitry 1308 may include various elements arranged in transmit or receive paths. These elements may include, for example, switches, mixers, amplifiers, filters, synthesizer circuitry, control circuitry, etc.

In the receive path, the RFEM may receive a radiated signal from an air interface via antenna structure 1326 and proceed to filter and amplify (with a low-noise amplifier) the signal. The signal may be provided to a receiver of the transceiver that down-converts the RF signal into a baseband signal that is provided to the baseband processor of the processors 1304.

In the transmit path, the transmitter of the transceiver up-converts the baseband signal received from the baseband processor and provides the RF signal to the RFEM. The RFEM may amplify the RF signal through a power amplifier prior to the signal being radiated across the air interface via the antenna 1326.

In various aspects, the RF interface circuitry 1308 may be configured to transmit/receive signals in a manner compatible with NR access technologies.

The antenna 1326 may include antenna elements to convert electrical signals into radio waves to travel through the air and to convert received radio waves into electrical signals. The antenna elements may be arranged into one or more antenna panels. The antenna 1326 may have antenna panels that are omnidirectional, directional, or a combination thereof to enable beamforming and multiple input, multiple output communications. The antenna 1326 may include microstrip antennas, printed antennas fabricated on the surface of one or more printed circuit boards, patch antennas, phased array antennas, etc. The antenna 1326 may have one or more panels designed for specific frequency bands including bands in frequency ranges 1 and 2.

The user interface circuitry 1316 includes various input/output (I/O) devices designed to enable user interaction with the UE 1300. The user interface 1316 includes input device circuitry and output device circuitry. Input device circuitry includes any physical or virtual means for accepting an input including, inter alia, one or more physical or virtual buttons (for example, a reset button), a physical keyboard, keypad, mouse, touchpad, touchscreen, microphones, scanner, headset, or the like. The output device circuitry includes any physical or virtual means for showing information or otherwise conveying information, such as sensor readings, actuator position(s), or other like information. Output device circuitry may include any number or combinations of audio or visual display, including, inter alia, one or more simple visual outputs/indicators (for example, binary status indicators such as light emitting diodes "LEDs" and multi-character visual outputs, or more complex outputs such as display devices or touchscreens (for example, liquid crystal displays "LCDs," LED displays, quantum dot displays, projectors, etc.), with the output of characters, graphics, multimedia objects, and the like being generated or produced from the operation of the UE 1300.

The sensors 1320 may include devices, modules, or subsystems whose purpose is to detect events or changes in its environment and send the information (sensor data) about the detected events to some other device, module, subsystem, etc. Examples of such sensors include, inter alia, inertia measurement units comprising accelerometers, gyroscopes, or magnetometers; microelectromechanical systems or nanoelectromechanical systems comprising 3-axis accelerometers, 3-axis gyroscopes, or magnetometers; level sensors; flow sensors; temperature sensors (for example, thermistors); pressure sensors; barometric pressure sensors; gravimeters; altimeters; image capture devices (for example, cameras or lensless apertures); light detection and ranging sensors; proximity sensors (for example, infrared radiation detector and the like); depth sensors; ambient light sensors; ultrasonic transceivers; microphones or other like audio capture devices; etc.

The driver circuitry 1322 may include software and hardware elements that operate to control particular devices that are embedded in the UE 1300, attached to the UE 1300, or otherwise communicatively coupled with the UE 1300. The driver circuitry 1322 may include individual drivers allowing other components to interact with or control various input/output (I/O) devices that may be present within, or connected to, the UE 1300. For example, driver circuitry 1322 may include a display driver to control and allow access to a display device, a touchscreen driver to control and allow access to a touchscreen interface, sensor drivers to obtain sensor readings of sensor circuitry 1320 and control and allow access to sensor circuitry 1320, drivers to obtain actuator positions of electro-mechanic components or control and allow access to the electro-mechanic components, a camera driver to control and allow access to an embedded image capture device, audio drivers to control and allow access to one or more audio devices.

The PMIC 1324 may manage power provided to various components of the UE 1300. In particular, with respect to the processors 1304, the PMIC 1324 may control power-source selection, voltage scaling, battery charging, or DC-to-DC conversion.

A battery 1328 may power the UE 1300, although in some examples the UE 1300 may be mounted deployed in a fixed location, and may have a power supply coupled to an electrical grid. The battery 1328 may be a lithium ion battery, a metal-air battery, such as a zinc-air battery, an aluminum-air battery, a lithium-air battery, and the like. In some implementations, such as in vehicle-based applications, the battery 1328 may be a typical lead-acid automotive battery.

Figure 14:
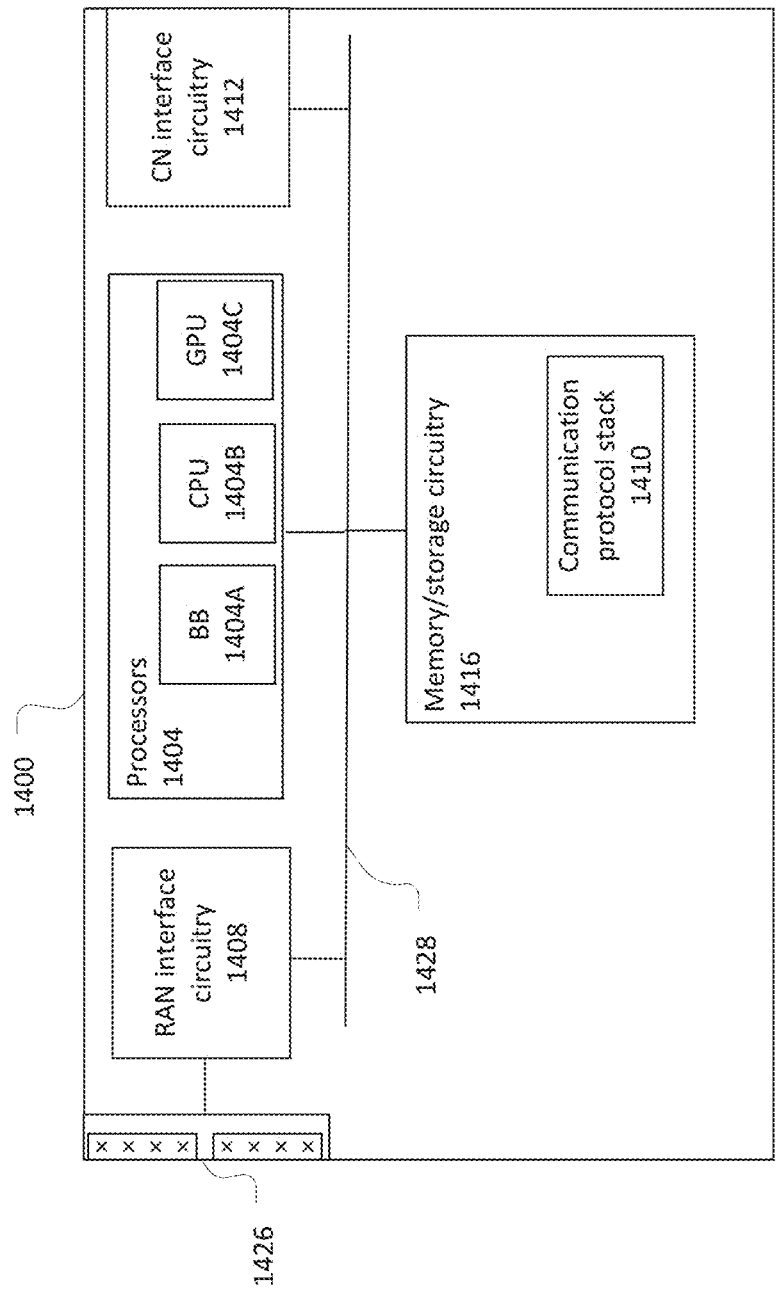
FIG. 14 illustrates a gNB in accordance with some aspects.

FIG. 14 illustrates a gNB 1400 in accordance with some aspects. The gNB node 1400 may similar to and substantially interchangeable with base station 148.

The gNB 1400 may include processors 1404, RF interface circuitry 1408, core network (CN) interface circuitry 1412, memory/storage circuitry 1416, and antenna structure 1426.

The components of the gNB 1400 may be coupled with various other components over one or more interconnects 1428.

The processors 1404, RF interface circuitry 1408, memory/storage circuitry 1416 (including communication protocol stack 1410), antenna structure 1426, and interconnects 1428 may be similar to like-named elements shown and described with respect to FIG. 13.

The CN interface circuitry 1412 may provide connectivity to a core network, for example, a $5^{th}$ Generation Core network (5GC) using a 5GC-compatible network interface protocol such as carrier Ethernet protocols, or some other suitable protocol. Network connectivity may be provided to/from the gNB 1400 via a fiber optic or wireless backhaul. The CN interface circuitry 1412 may include one or more dedicated processors or FPGAs to communicate using one or more of the aforementioned protocols. In some implementations, the CN interface circuitry 1412 may include multiple controllers to provide connectivity to other networks using the same or different protocols.

In some aspects, the gNB 1400 may be coupled with transmit receive points (TRPs) using the antenna structure 1426, CN interface circuitry, or other interface circuitry.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

For one or more aspects, at least one of the components set forth in one or more of the preceding figures may be configured to perform one or more operations, techniques, processes, or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

EXAMPLES

In the following sections, further exemplary aspects are provided.

Example 1 may include a method of operating a UE, the method comprising: receiving, from a base station, information to configure a pool of sidelink resources and to provide an indication of a type of assistance information, available from the base station, for selecting resources of the pool; identifying sidelink data to be transmitted; determining whether base station assistance is triggered; selecting resources from the pool of sidelink resources; and transmitting the sidelink data on at least a portion of the selected resources.

Example 2 may include the method of example 1 or some other example herein, further comprising: determining that base station assistance is triggered; transmitting a request to the base station for assistance information of the type of assistance information; receiving the assistance information; and selecting the resources from the pool of sidelink resources based on the assistance information.

Example 3 may include the method of example 2 or some other example herein, wherein the request includes: a resource selection window; a sensing window; latency information for the assistance information; a priority indication associated with sidelink data; an index of the pool; location information of the UE; or a number of resources requested.

Example 4 may include the method of example 2 or some other example herein, wherein the assistance information is to indicate a plurality of available resources of the pool of sidelink resources and the instructions, when executed, further cause the UE to: randomly select resources from the plurality of available resources.

Example 5 may include the method of example 2 or some other example herein, wherein the assistance information includes a resource map that comprises a bitmap to indicate whether individual resources of a plurality of resources of the pool are available or unavailable.

Example 6 may include the method of example 5 or some other example herein, wherein the resource map further includes a reference signal receive power, RSRP, level or reservation information for individual resources, slots, or subchannels of the pool.

Example 7 may include the method of example 6 or some other example herein, wherein the method further comprises: selecting the resources from the pool of sidelink resources based further on the RSRP level or reservation information for the individual resources, slots, or subchannels of the pool.

Example 8 may include the method of example 2 or some other example herein, wherein the assistance information includes an indication of a set of available resources or an indication of a set of unavailable resources.

Example 9 may include the method of example 1 or some other example herein, wherein determining whether base station assistance is triggered comprises: determining base station assistance is triggered if the priority of the sidelink data is greater than a predetermined priority threshold.

Example 10 may include the method of example 1 or some other example herein, wherein determining whether base station assistance is triggered comprises: determining base station assistance is triggered if a packet delay budget, PDB, of the sidelink data is greater than a predetermined priority threshold.

Example 11 may include the method of example 1 or some other example herein, wherein determining whether base station assistance is triggered comprises: determining base station assistance is triggered if the sidelink data is periodic data.

Example 12 may include the method of example 1 or some other example herein, further comprising: determining whether base station assistance is triggered based on a service subscription of the UE, a capability of the UE, or a configuration of the pool of sidelink resources.

Example 13 may include a method of operating a base station, the method comprising: storing resource pool occupation data; transmitting, to a user equipment, UE, information to configure the UE with base station-assisted sidelink communication; receiving, from the UE, a request for base station assistance with respect to a pool of sidelink resources; generating, based on the resource pool occupation data, assistance information corresponding to the pool of sidelink resources; and transmitting the assistance information to the UE.

Example 14 may include the method of example 13 or some other example herein, further comprising: collecting the resource pool occupation data from one or more coordinating UEs.

Example 15 may include the method of example 13 or some other example herein, wherein the request is to include location information with respect to the UE or priority or periodicity information with respect to sidelink data to be transmitted using resources of the pool of sidelink resources, and the method further comprises: generating the assistance information based on the location information, the priority information, or the periodicity information.

Example 16 may include the method of example 13 or some other example herein, further comprising: transmitting, to the UE, information to configure at least a portion of the pool of sidelink resources for full-sensing resource allocation or reduced-sensing resource allocation; and generating the assistance information based on whether at least the portion is configured for full-sensing resource allocation or reduced-sensing resource allocation.

Example 17 may include the method of example 16 or some other example herein, further comprising: providing a first quantity of sensing results if at least the portion of sidelink resources are configured for full-sensing resource allocation; and providing a second quantity of sensing results if at least the portion of sidelink resources are configured for reduced-sensing resource allocation, wherein the first quantity is greater than the second quantity Example 18 may include a method of operating a transmit-only user equipment, UE, the method comprising: receiving, from a base station, information to configure a pool of sidelink resources and to provide an indication of a type of assistance information, available from the base station, for selecting resources of the pool; receiving periodic assistance information from the base station, the periodic assistance information with respect to availability of the pool of sidelink resources; identifying sidelink data to be transmitted; selecting resources from the pool of sidelink resources based on the periodic assistance information; and transmitting the sidelink data on at least a portion of the selected resources.

Example 19 may include the method of example 18 or some other example herein, wherein the periodic assistance information is to indicate a plurality of available resources of the pool of sidelink resources and the method further comprises: randomly selecting resources from the plurality of available resources.

Example 20 may include the method of example 18 or some other example herein, wherein the periodic assistance information includes a resource map that comprises: a bitmap to indicate whether individual resources of a plurality of resources of the pool are available or unavailable; or first bitmap to indicate whether individual slots of a plurality of slots of the pool are available or unavailable and a second bitmap to indicate whether individual subchannels of a plurality of subchannels of the pool are available or unavailable.

Example 21 may include the method of example 18 or some other example herein, wherein the resource map further includes a reference signal receive power, RSRP, level or reservation information for individual resources, slots, or subchannels of the pool.

Example 22 may include the method of example 21 or some other example herein, further comprising: selecting the resources from the pool of sidelink resources based further on the RSRP level or reservation information for the individual resources, slots, or subchannels of the pool.

Example 23 may include a method of operating a base station, the method comprising: configuring a transmit-only user equipment, UE, for periodic assistance in selection of resources from a pool of sidelink resources; collecting resource pool occupation data from one or more coordinating UEs; and periodically transmitting assistance information, based on the resource pool occupation data, to the transmit-only UE.

Example 24 may include the method of example 23 or some other example herein, further comprising: receiving information from the UE, the information to indicate a location of the UE, a priority of data to be transmitted using the pool of sidelink resources, or a periodicity of the data to be transmitted using the pool of sidelink resources; and generating the periodic assistance information based on the information received from the UE.

Example 25 may include the method of example 23 or some other example herein, further comprising: configuring at least a portion of the pool of sidelink resources for full-sensing resource allocation or reduced-sensing resource allocation; and generating the periodic assistance information based on whether at least the portion is configured for full-sensing resource allocation or reduced-sensing resource allocation.

Example 26 may include an apparatus comprising means to perform one or more elements of a method described in or related to any of examples 1-25, or any other method or process described herein.

Example 27 may include one or more non-transitory computer-readable media comprising instructions to cause an electronic device, upon execution of the instructions by one or more processors of the electronic device, to perform one or more elements of a method described in or related to any of examples 1-25, or any other method or process described herein.

Example 28 may include an apparatus comprising logic, modules, or circuitry to perform one or more elements of a method described in or related to any of examples 1-25, or any other method or process described herein.

Example 29 may include a method, technique, or process as described in or related to any of examples 1-25, or portions or parts thereof.

Example 30 may include an apparatus comprising: one or more processors and one or more computer-readable media comprising instructions that, when executed by the one or more processors, cause the one or more processors to perform the method, techniques, or process as described in or related to any of examples 1-25, or portions thereof.

Example 31 may include a signal as described in or related to any of examples 1-25, or portions or parts thereof.

Example 32 may include a datagram, information element, packet, frame, segment, PDU, or message as described in or related to any of examples 1-25, or portions or parts thereof, or otherwise described in the present disclosure.

Example 33 may include a signal encoded with data as described in or related to any of examples 1-25, or portions or parts thereof, or otherwise described in the present disclosure.

Example 34 may include a signal encoded with a datagram, IE, packet, frame, segment, PDU, or message as described in or related to any of examples 1-25, or portions or parts thereof, or otherwise described in the present disclosure.

Example 35 may include an electromagnetic signal carrying computer-readable instructions, wherein execution of the computer-readable instructions by one or more processors is to cause the one or more processors to perform the method, techniques, or process as described in or related to any of examples 1-25, or portions thereof.

Example 36 may include a computer program comprising instructions, wherein execution of the program by a processing element is to cause the processing element to carry out the method, techniques, or process as described in or related to any of examples 1-25, or portions thereof.

Example 37 may include a signal in a wireless network as shown and described herein.

Example 38 may include a method of communicating in a wireless network as shown and described herein.

Example 39 may include a system for providing wireless communication as shown and described herein.

Example 40 may include a device for providing wireless communication as shown and described herein.

Any of the above-described examples may be combined with any other example (or combination of examples), unless explicitly stated otherwise. The foregoing description of one or more implementations provides illustration and description, but is not intended to be exhaustive or to limit the scope of aspects to the precise form disclosed. Modifications and variations are possible in light of the above teachings or may be acquired from practice of various aspects.

Although the aspects above have been described in considerable detail, numerous variations and modifications will become apparent to those skilled in the art once the above disclosure is fully appreciated. It is intended that the following claims be interpreted to embrace all such variations and modifications.

What is claimed is:

1. One or more non-transitory, computer-readable media having instructions that, when executed, cause processing circuitry to:
   receive, from a base station, information to configure a pool of sidelink resources and to provide an indication of a type of assistance information, available from the base station, for selecting resources of the pool;
   identify sidelink data to be transmitted;
   determine whether base station assistance is triggered;
   select resources from the pool of sidelink resources based at least in part on whether the base station assistance is triggered; and
   output, to a transceiver, the sidelink data for transmission on at least a portion of the selected resources.

2. The one or more non-transitory, computer-readable media of claim 1, wherein to determine whether the base station assistance is triggered comprises to determine that base station assistance is triggered and the instructions, when executed, further cause the processing circuitry to:
   generate, based at least in part on determination that the base station assistance is triggered, a request to be transmitted to the base station for assistance information of the type of assistance information;
   receive the assistance information; and
   select the resources from the pool of sidelink resources based at least in part on the assistance information.

3. The one or more non-transitory, computer-readable media of claim 2, wherein the request includes: a resource selection window; a sensing window; latency information for the assistance information; a priority indication associated with sidelink data; an index of the pool; location information of a user equipment; or a number of resources requested.

4. The one or more non-transitory, computer-readable media of claim 2, wherein the assistance information is to indicate a plurality of available resources of the pool of sidelink resources and the instructions, when executed, further cause the processing circuitry to:
   randomly select resources from the plurality of available resources.

5. The one or more non-transitory, computer-readable media of claim 2, wherein the assistance information includes a resource map that comprises a bitmap to indicate whether individual resources of a plurality of resources of the pool are available or unavailable.

6. The one or more non-transitory, computer-readable media of claim 5, wherein the resource map further includes a reference signal receive power (RSRP) level or reservation information for individual resources, slots, or subchannels of the pool.

7. The one or more non-transitory, computer-readable media of claim 6, wherein the instructions, when executed, further cause the processing circuitry to: select the resources from the pool of sidelink resources based at least in part on the RSRP level or reservation information for the individual resources, slots, or subchannels of the pool.

8. The one or more non-transitory, computer-readable media of claim 2, wherein the assistance information includes an indication of a set of available resources or an indication of a set of unavailable resources.

9. The one or more non-transitory, computer-readable media of claim 1, wherein to determine whether base station assistance is triggered, the processing circuitry is to:
   determine base station assistance is triggered if a priority of the sidelink data is greater than a predetermined priority threshold.

10. The one or more non-transitory, computer-readable media of claim 1, wherein to determine whether base station assistance is triggered, the processing circuitry is to:
    determine base station assistance is triggered if a packet delay budget (PDB) of the sidelink data is greater than a predetermined priority threshold.

11. The one or more non-transitory, computer-readable media of claim 1, wherein to determine whether base station assistance is triggered, the processing circuitry is to:
    determine base station assistance is triggered if the sidelink data is periodic data.

12. The one or more non-transitory, computer-readable media of claim 1, wherein the instructions, when executed, further cause the processing circuitry to: determine whether base station assistance is triggered based at least in part on a service subscription of a user equipment, a capability of a user equipment, or a configuration of the pool of sidelink resources.

13. A base station comprising:
    memory to store resource pool occupation data; and
    processing circuitry, coupled with the memory, the processing circuitry to:

transmit, to a user equipment (UE) information to configure the UE with base station-assisted sidelink communication;

collect the resource pool occupation data from one or more coordinating UEs;

receive, from the UE, a request for base station assistance with respect to a pool of sidelink resources;

generate, based at least in part on the request and the resource pool occupation data, assistance information corresponding to the pool of sidelink resources; and transmit the assistance information to the UE.

14. The base station of claim 13, wherein the request is to include location information with respect to the UE or priority or periodicity information with respect to sidelink data to be transmitted using resources of the pool of sidelink resources, and the processing circuitry is to generate the assistance information based at least in part on the location information, the priority information, or the periodicity information.

15. The base station of claim 13, wherein the processing circuitry is further to:

transmit, to the UE, information to configure at least a portion of the pool of sidelink resources for full-sensing resource allocation or reduced-sensing resource allocation; and generate the assistance information based at least in part on whether at least the portion is configured for full-sensing resource allocation or reduced-sensing resource allocation.

16. The base station of claim 15, wherein the processing circuitry is further to:

provide a first quantity of sensing results if at least the portion of the pool of sidelink resources are configured for full-sensing resource allocation; and provide a second quantity of sensing results if at least the portion of the pool of sidelink resources are configured for reduced-sensing resource allocation, wherein the first quantity is greater than the second quantity.

17. A user equipment (UE) comprising:

radio-frequency (RF) interface circuitry; and processing circuitry, coupled with the RF interface circuitry, the processing circuitry to:

receive, from a base station via the RF interface circuitry, information to configure a pool of sidelink resources and to provide an indication of a type of assistance information, available from the base station, for selecting resources of the pool;

identify sidelink data to be transmitted;

determine whether base station assistance is triggered;

select resources from the pool of sidelink resources based at least in part on whether the base station assistance is triggered; and transmit, via the RF interface circuitry, the sidelink data on at least a portion of the selected resources.

18. The UE of claim 17, wherein to determine whether base station assistance is triggered comprises to determine that base station assistance is triggered and the processing circuitry is further to:

transmit, via the RF interface circuitry, a request to the base station for assistance information of the type of assistance information based at least in part on determination that the base station assistance is triggered;

receive, via the RF interface circuitry, the assistance information; and select the resources from the pool of sidelink resources based at least in part on the assistance information.

19. The UE of claim 18, wherein the request includes: a resource selection window; a sensing window; latency information for the assistance information; a priority indication associated with sidelink data; an index of the pool; location information of the UE; or a number of resources requested.

* * * * *